United States Patent
Seki

(10) Patent No.: US 9,964,887 B2
(45) Date of Patent: May 8, 2018

(54) LIGHT SCANNING APPARATUS AND IMAGE FORMING APPARATUS

(71) Applicant: CANON KABUSHIKI KAISHA, Tokyo (JP)

(72) Inventor: Yuichi Seki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/345,114

(22) Filed: Nov. 7, 2016

(65) Prior Publication Data

US 2017/0139342 A1    May 18, 2017

(30) Foreign Application Priority Data

Nov. 16, 2015  (JP) ................................. 2015-223931

(51) Int. Cl.
| | |
|---|---|
| *G03G 15/10* | (2006.01) |
| *G03G 15/043* | (2006.01) |
| *H04N 1/00* | (2006.01) |
| *H04N 1/06* | (2006.01) |
| *H04N 1/113* | (2006.01) |

(52) U.S. Cl.
CPC ......... *G03G 15/043* (2013.01); *H04N 1/0057* (2013.01); *H04N 1/00904* (2013.01); *H04N 1/06* (2013.01); *H04N 1/113* (2013.01); *H04N 2201/0081* (2013.01)

(58) Field of Classification Search
CPC ............... G03G 15/043; H04N 1/0057; H04N 1/00904; H04N 1/06; H04N 1/113; H04N 2201/0081
See application file for complete search history.

(56) References Cited

U.S. PATENT DOCUMENTS

| | | | | |
|---|---|---|---|---|
| 5,043,745 | A | * 8/1991 | Inoue | G06K 15/1214 347/246 |
| 6,560,256 | B1 | 5/2003 | Seki et al. | 372/38.02 |
| 6,919,979 | B2 | 7/2005 | Seki et al. | 359/204.1 |
| 7,106,770 | B2 | 9/2006 | Seki | 372/43.01 |
| 7,129,967 | B2 | 10/2006 | Seki et al. | 347/249 |

(Continued)

OTHER PUBLICATIONS

U.S. Appl. No. 15/255,889, filed Sep. 2, 2016.
U.S. Appl. No. 15/229,069, filed Aug. 4, 2016.

*Primary Examiner* — David Bolduc
(74) *Attorney, Agent, or Firm* — Fitzpatrick, Cella, Harper & Scinto

(57) ABSTRACT

A light scanning apparatus, including: a light source; a light intensity detecting portion configured to detect a light intensity of the light beam emitted from the light source; and a light intensity controller configured to control the light intensity based on a detection result of the light intensity detecting portion, wherein the light intensity controller is configured to supply, in advance, to the light source, a bias current smaller than a threshold current at which the light source starts emitting the light beam, and is configured to control a supply of a drive current to the light source, the drive current being generated by superimposing, on the bias current, a switching current for controlling the light source in accordance with an image signal, and the light intensity controller includes a current stopping unit configured to stop a supply of the bias current and the drive current to the light source.

1 Claim, 13 Drawing Sheets

(56) References Cited

U.S. PATENT DOCUMENTS

| | | | | |
|---|---|---|---|---|
| 7,294,824 B2* | 11/2007 | Maeda | | G02B 26/127 250/234 |
| 7,586,511 B2 | 9/2009 | Seki et al. | | 347/249 |
| 8,305,416 B2 | 11/2012 | Maeda | | 347/237 |
| 8,963,978 B2 | 2/2015 | Seki | | 347/237 |
| 9,091,955 B2 | 7/2015 | Seki | | G03G 15/04072 |
| 2003/0112420 A1* | 6/2003 | Suda | | H04N 1/40037 355/67 |
| 2004/0174428 A1* | 9/2004 | Seki | | H04N 1/047 347/250 |
| 2008/0292342 A1* | 11/2008 | Yamashita | | G02B 26/127 399/51 |
| 2009/0190943 A1* | 7/2009 | Yamashita | | G03G 15/043 399/51 |
| 2010/0066799 A1* | 3/2010 | Yamashita | | B41J 2/473 347/225 |
| 2010/0150591 A1* | 6/2010 | Yamashita | | B41J 2/473 399/51 |
| 2011/0001788 A1* | 1/2011 | Yamamoto | | G03G 15/043 347/224 |
| 2011/0043594 A1* | 2/2011 | Yamashita | | B41J 2/473 347/246 |
| 2011/0228037 A1* | 9/2011 | Omori | | G03G 15/043 347/247 |
| 2012/0243023 A1* | 9/2012 | Seki | | G06K 15/1214 358/1.13 |
| 2012/0268723 A1* | 10/2012 | Seki | | G03G 15/043 355/67 |
| 2014/0375744 A1* | 12/2014 | Yamazaki | | G03G 15/043 347/118 |
| 2015/0002600 A1* | 1/2015 | Seki | | G03G 15/04072 347/134 |
| 2015/0286160 A1* | 10/2015 | Akagi | | G03G 15/043 347/118 |
| 2015/0331352 A1* | 11/2015 | Motoyama | | G02B 26/121 347/118 |
| 2015/0338765 A1* | 11/2015 | Akagi | | H04N 1/113 347/118 |
| 2015/0338766 A1* | 11/2015 | Seki | | B41J 2/47 347/118 |
| 2017/0052473 A1* | 2/2017 | Seki | | G03G 15/043 |
| 2017/0075250 A1* | 3/2017 | Seki | | G03G 15/0409 |

* cited by examiner

FIG. 8

| FIG. 8A |
| FIG. 8B |

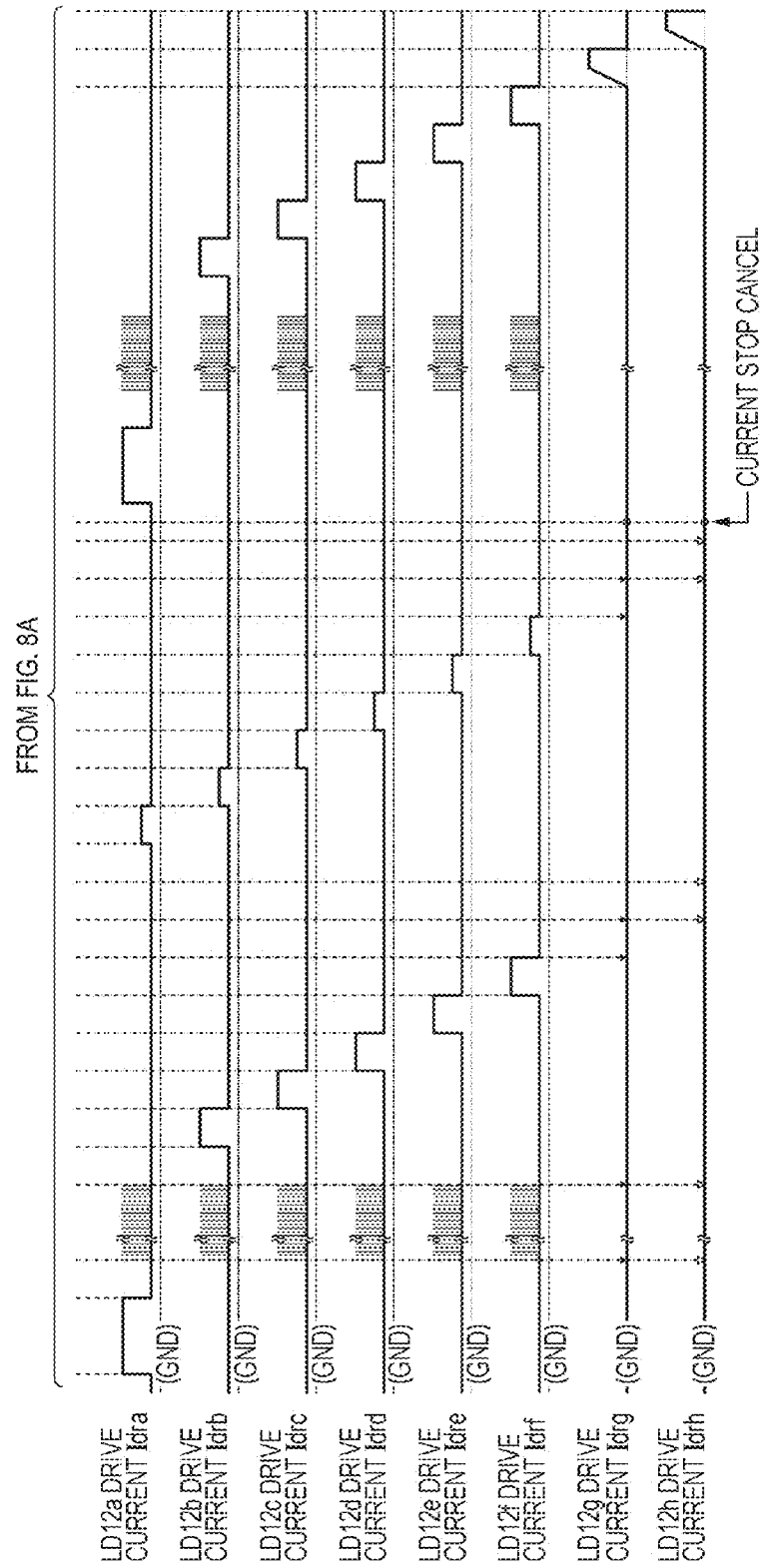

LIGHT SCANNING APPARATUS AND IMAGE FORMING APPARATUS

BACKGROUND OF THE INVENTION

Field of the Invention

The present invention relates to a light scanning apparatus which includes a light intensity controller configured to control the light intensity of a light beam, and to an image forming apparatus.

Description of the Related Art

Some known a light scanning apparatus provided in an image forming apparatus uses a method of irradiating a photosensitive drum via an fθ lens with a light beam which is deflected by a rotary polygon mirror after exiting a light source. In recent years, an image forming apparatus has been demanded to form a high quality image at high speed and, to meet the demand, uses a multi-beam light source, which is configured to emit a plurality of light beams concurrently from a plurality of light emitting points, as a light source for emitting light beams.

Meanwhile, a light scanning apparatus switches the rotation speed of the rotary polygon mirror and the number of light emitting points of the light source in response to a change in printing speed (transmission), a change in image resolution, or a change in the rotation speed of the photosensitive drum which depends on the thickness of the recording medium. In U.S. Pat. No. 8,305,416, there is disclosed a light intensity control under which light for an image forming area on a surface of the photosensitive drum is emitted from a smaller number of light emitting points that is suited to image data, and light for a non-image forming area on the drum surface is emitted from all light emitting points on light emission schedules different from one another.

However, in the case where the number of light beams is changeovered by using laser drive substrates of the same type in which control for supplying a bias current to a plurality of light emitting points is exerted in order to improve the light beam output responsiveness for different types of light scanning apparatus, a bias current is supplied also to a light emitting point that is not in use. This presents a difficulty in reducing the power consumption of the light scanning apparatus. When the light source used is a VCSEL or another light source that emits a large number of light beams, power consumption due to the current supplied to light emitting points that are not in use is particularly large, which is a problem.

SUMMARY OF THE INVENTION

Therefore, the present invention provides a light scanning apparatus configured to stop the supply of an electric current to a light source.

In order to solve the problem described above, a light scanning apparatus according to one embodiment of the present invention comprises:
a light source configured to emit a light beam;
a light intensity detecting portion configured to detect a light intensity of the light beam; and
a light intensity controller configured to control the light intensity of the light beam based on a detection result of the light intensity detecting portion,
wherein the light intensity controller is configured to supply, in advance, to the light source, a bias current smaller than a threshold current at which the light source starts emitting the light beam, and is configured to control a supply of a drive current to the light source, the drive current being generated by superimposing, on the bias current, a switching current which has been modulated in order to control a light emission of the light source in accordance with an image signal, and
wherein the light intensity controller comprises a current stopping unit configured to stop a supply of the bias current and the drive current to the light source.

Further features of the present invention will become apparent from the following description of exemplary embodiments with reference to the attached drawings.

BRIEF DESCRIPTION OF THE DRAWINGS

FIG. 8, comprised collectively of FIGS. 8A and 8B, is a timing chart for illustrating a relation between a current stop signal and a drive current in the second embodiment.

DESCRIPTION OF THE EMBODIMENTS

Now, modes for carrying out the present invention will be described referring to the accompanying drawings.

First Embodiment (Image Forming Apparatus)

Figure 11:
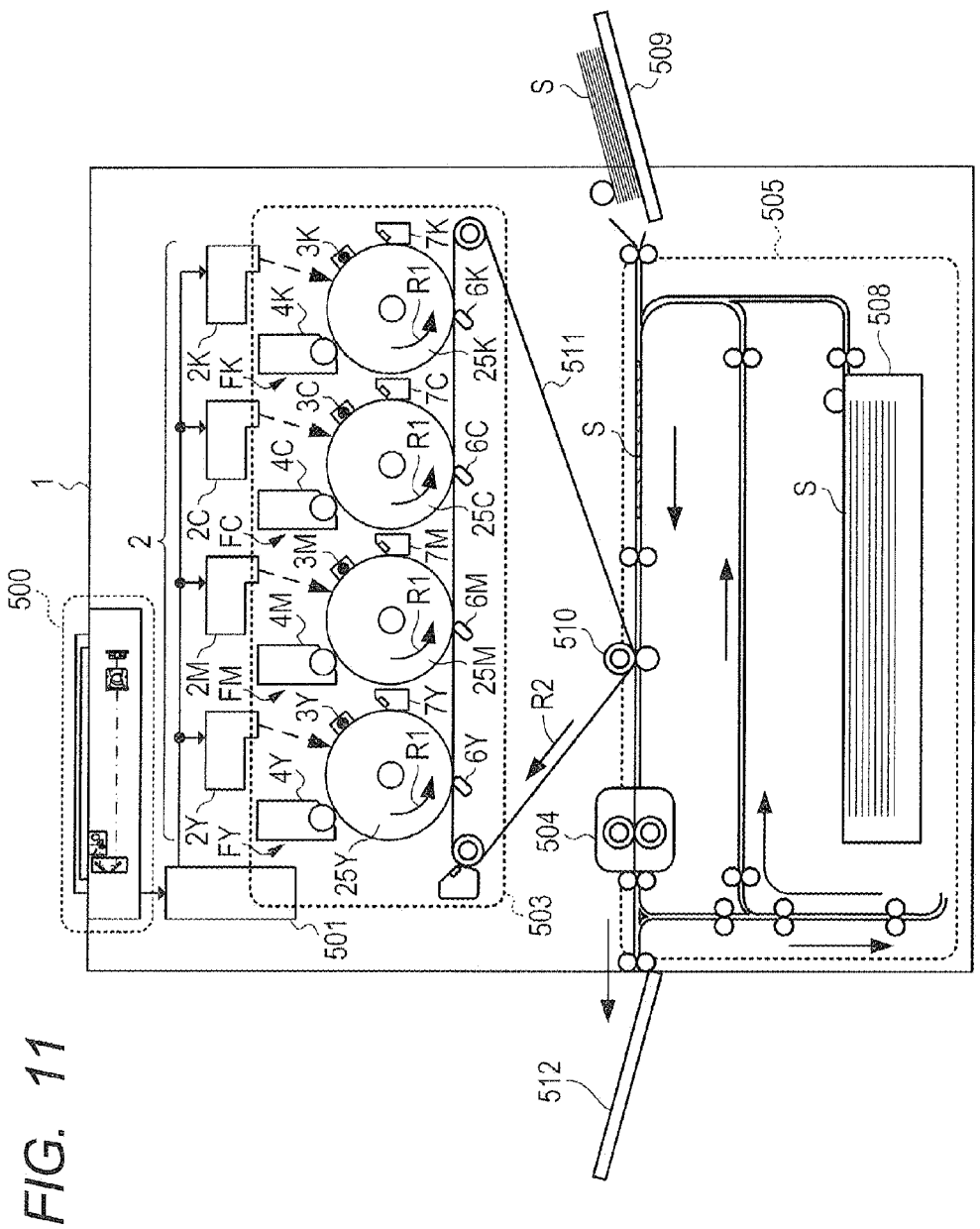
FIG. 11 is a sectional view of an image forming apparatus according to the first embodiment.

An electrophotographic image forming apparatus 1 according to a first embodiment will be described. FIG. 11 is a sectional view of the image forming apparatus 1 according to the first embodiment. The image forming apparatus 1 includes light scanning apparatus 2 (2Y, 2M, 2C, and 2K), an image controller 501, an image reading portion 500, an image forming portion 503 having photosensitive drums (photosensitive members) 25, a fixing portion 504, and a sheet feeding and conveying portion 505. The image reading portion 500 is configured to illuminate an original placed on an original platen, optically read an image of the original, and convert the read image into image data (electric signal). The image controller 501 is configured to receive the image data from the image reading portion 500 and convert the received image data into an image signal. The image controller 501 is further configured to transmit the image signal (22n or 22p) to each light scanning apparatus 2, and to transmit various control signals (62, 63, 64, and 73) for controlling the light emission of the light scanning apparatus 2 to the light scanning apparatus 2. The control signals (62, 63, 64, and 73) are setting signals for setting the operation mode of the light scanning apparatus 2.

The image forming portion 503 includes four image forming stations F (FY, FM, FC, and FK). The four image forming stations F are arranged in the order of yellow (Y), magenta (M), cyan (C), and black (K) along a rotation direction R2 of an endless intermediate transfer belt (hereinafter referred to as "intermediate transfer member") 511. The image forming stations F include photosensitive drums 25 (25Y, 25M, 25C, and 25K), respectively, serving as image bearing members rotated in a direction indicated by arrows R1. Around the photosensitive drums 25, there are arranged chargers (charging units) 3, the light scanning apparatus 2, developing devices (developing units) 4, primary transfer members 6 (6Y, 6M, 6C, and 6K), and cleaning devices 7 (7Y, 7M, 7C, and 7K), respectively, along the rotation direction indicated by the arrows R1.

The chargers 3 (3Y, 3M, 3C, and 3K) are configured to uniformly charge surfaces of the rotating photosensitive drums 25 (25Y, 25M, 25C, and 25K), respectively. The light scanning apparatus 2 (2Y, 2M, 2C, and 2K) are configured to emit light beams modulated in accordance with image signals, to thereby form electrostatic latent images on the surfaces of the photosensitive drums 25 (25Y, 25M, 25C, and 25K). The developing devices 4 (4Y, 4M, 4C, and 4K) are configured to develop the electrostatic latent images formed on the photosensitive drums 25 (25Y, 25M, 25C, and 25K) with toner (developer) of respective colors, to thereby form toner images. The primary transfer members 6 (6Y, 6M, 6C, and 6K) are configured to perform primary transfer of the toner images on the photosensitive drums 25 (25Y, 25M, 25C, and 25K) sequentially onto the intermediate transfer member 511 to superimpose the images one on another. The cleaning devices 7 (7Y, 7M, 7C, and 7K) are configured to collect residual toner on the photosensitive drums 25 (25Y, 25M, 25C, and 25K) after the primary transfer.

The light scanning apparatus 2 (2Y, 2M, 2C, and 2K) are configured to sequentially start the emission of a light beam for a yellow image, a magenta image, a cyan image, and a black image after the light beam emitting start timing arrives for the yellow image. The emitting start timing of the light scanning apparatus 2 is controlled in a sub-scanning direction, to thereby transfer onto the intermediate transfer member 511 toner images of four colors which are superimposed without a color misregistration. A recording medium (hereinafter referred to as "sheet") S is conveyed from a sheet feeding cassette 508 of the sheet feeding and conveying portion 505 or from a manual feeding tray 509 to a secondary transfer roller 510. The secondary transfer roller 510 is configured to perform secondary transfer of collectively transferring the toner images on the intermediate transfer member 511 onto the sheet S. The sheet S having the toner images transferred thereon is conveyed to the fixing portion 504. The fixing portion 504 is configured to heat and press the sheet S to fuse the toner, to thereby fix the toner image onto the sheet S. With this, a full-color image is formed on the sheet S. The sheet S having the image formed thereon is delivered to a delivery tray 512.

(Light Scanning Apparatus)

Figure 1:
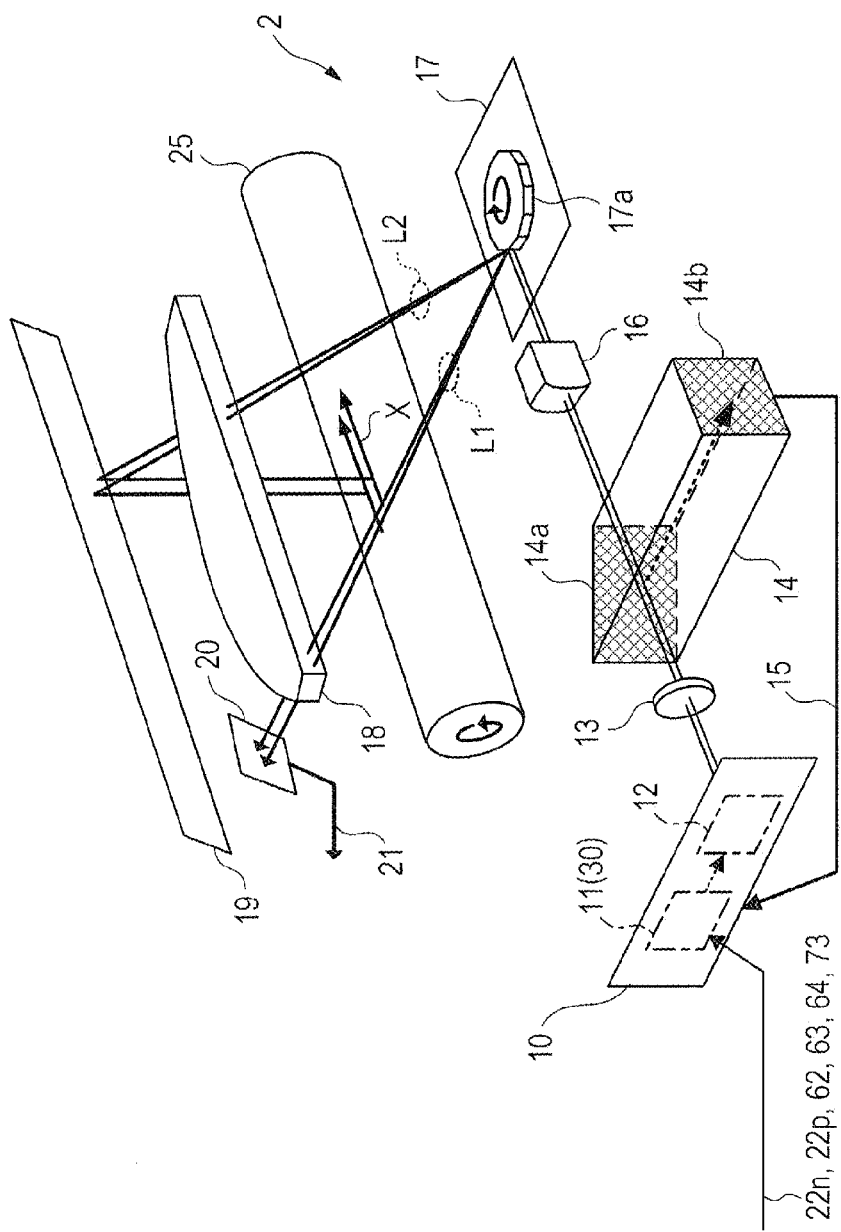
FIG. 1 is an explanatory view of a light scanning apparatus according to a first embodiment of the present invention.

FIG. 1 is an explanatory view of the light scanning apparatus 2 according to the first embodiment. Each light scanning apparatus 2 includes a laser drive portion 11 and a laser diode (hereinafter abbreviated as "LD") 12, which serves as a light source. The laser drive portion 11 and the LD 12 are provided on a laser drive substrate 10. The laser drive portion 11 (for example, a laser driver IC) is configured to output a drive current Idr for causing the LD 12 to emit light. The light scanning apparatus 2 further includes a collimator lens 13, a light intensity detecting unit 14, a cylindrical lens 16, a motor 17, an fθ lens 18, a reflection mirror 19, and a beam detector (hereinafter abbreviated as "BD") 20. A rotor of the motor 17 is configured to rotate integrally with a rotary polygon mirror (deflector) 17a. In a non-image area, laser light (hereinafter referred to as "light beam") L1 emitted from the LD 12 reaches the rotary polygon mirror 17a after passing through the collimator lens 13 and the cylindrical lens 16. The light beam L1 deflected by the rotary polygon mirror 17a enters the BD 20 after passing through the fθ lens 18. The BD 20 receives the light beam L1 and then outputs a beam detection signal (hereinafter referred to as "BD signal") 21 for fixing the image writing start position in one place in a main scanning direction X. A light beam L2 emitted from the LD 12 based on the BD signal 21 travels through the fθ lens 18, is reflected by the reflection mirror 19, and is run over the corresponding photosensitive drum 25 in the main scanning direction X in an image area to form an electrostatic latent image. The LD 12 may emit a plurality of light beams. The rotary polygon mirror 17a and the motor 17 serve as a deflecting device configured to deflect the light beam L2 so that the light beam L2 emitted from the LD 12 is run over a surface of the photosensitive drum 25 in the main scanning direction X.

(Light Intensity Controller)

Figure 2:
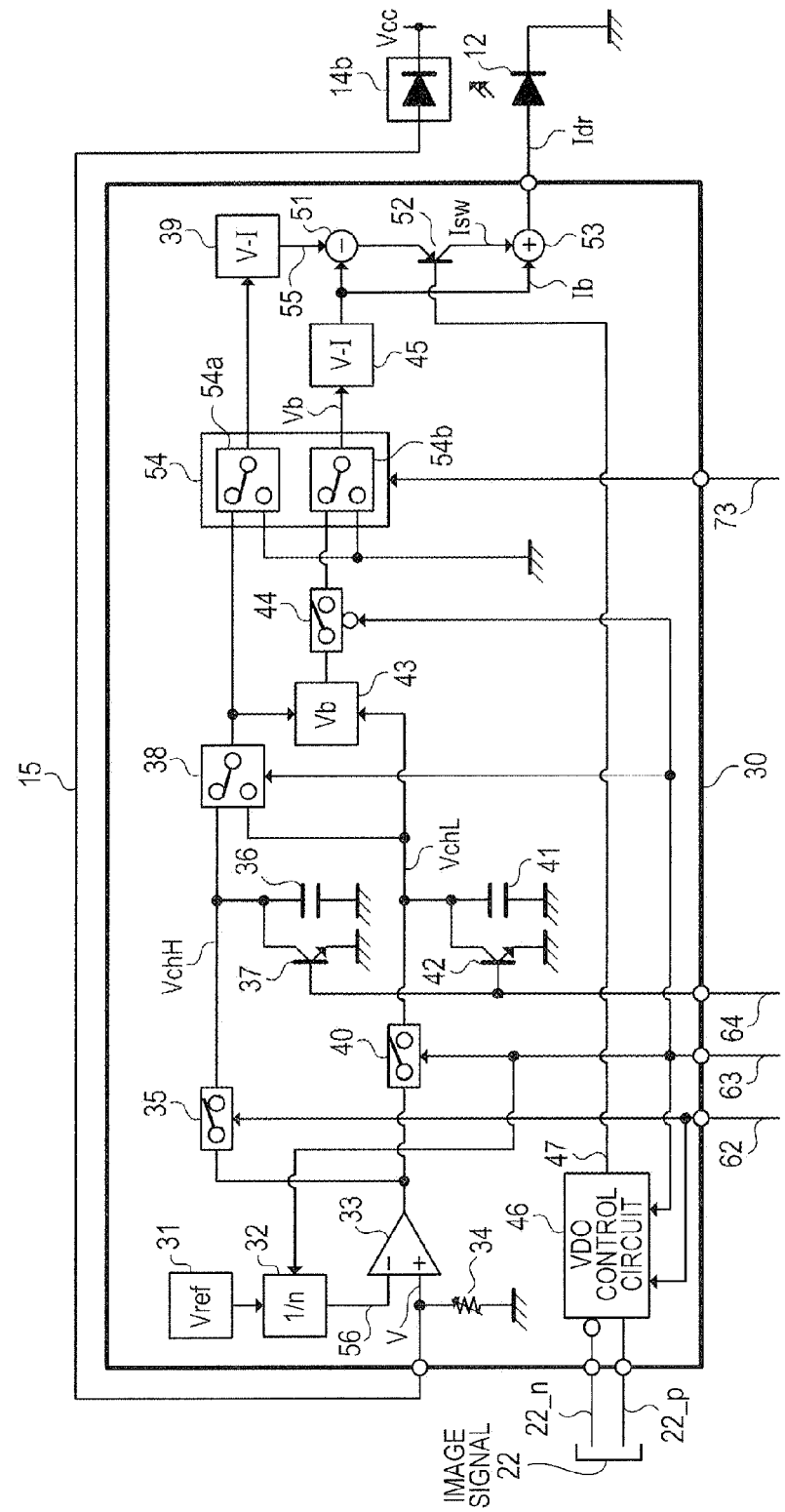
FIG. 2 is a block diagram of a light intensity controller according to the first embodiment.

FIG. 2 is a block diagram of a light intensity controller 30 according to the first embodiment. The light intensity controller 30 corresponds to the laser drive portion 11 of FIG. 1. The states of internal circuits of the light intensity controller 30 in different operation modes are shown in Table 1.

TABLE 1

| Operation mode | Output voltage of voltage divider 32 | Upper sampling circuit 35 | Lower sampling circuit 40 | Changeover switch 38 | Switch 44 | VDO control circuit 46 | Discharge circuits 37 and 42 |
|---|---|---|---|---|---|---|---|
| Upper light intensity control | Vref × 1/1 | ON | OFF | Upper | ON | ON | OFF |
| Lower light intensity control | Vref × 1/4 | OFF | ON | Lower | OFF | ON | OFF |

TABLE 1-continued

| Operation mode | Output voltage of voltage divider 32 | Upper sampling circuit 35 | Lower sampling circuit 40 | Changeover switch 38 | Switch 44 | VDO control circuit 46 | Discharge circuits 37 and 42 |
|---|---|---|---|---|---|---|---|
| Constant current control | — | OFF | OFF | Upper | ON | ON/OFF | OFF |
| Initialization | — | OFF | OFF | Upper | ON | OFF | ON |

The light intensity controller 30 can operate in a plurality of operation modes, including an upper light intensity control mode (APC-H), a lower light intensity control mode (APC-L), a constant current control mode, an initialization mode, and a current stop control mode. The selection of an operation mode from the plurality of operation modes of the light intensity controller 30 is made with the use of a plurality of control signals output from the image controller 501. An upper light intensity control signal 62, a lower light intensity control signal 63, a discharge signal 64, and a current stop signal 73 are included among the plurality of control signals. Shown in Table 1 are the states of the internal circuits of the light intensity controller 30 in the upper light intensity control mode (APC-H), the lower light intensity control mode (APC-L), the constant current control mode, and the initialization mode. The current stop control mode will be described later.

The light intensity controller 30 is provided in the laser drive portion 11. The light intensity controller is configured to perform auto bias light intensity control in which a bias current (standby current) Ib is calculated based on the light intensity of the LD 12. The LD 12 has a delayed light emission phenomenon. The delayed light emission phenomenon causes a drop in the light beam output responsiveness of the LD 12. In order to improve the light beam output responsiveness, the light intensity controller 30 supplies the bias current Ib to the LD 12 in advance. The bias current Ib is set to a value smaller than a threshold current (light emission start current) Ith, at which the LD 12 starts laser oscillation. Supplying the bias current Ib to the LD 12 does not cause the LD 12 to emit a light beam (laser light), but causes the LD 12 to cast faint light having as wide a wavelength range as that of an LED (LED light).

The light intensity controller 30 operates in the upper light intensity control mode and the lower light intensity control mode in order to calculate the bias current Ib. In the upper light intensity control mode, the light intensity controller 30 obtains a high-level voltage VchH by causing the LD 12 to emit a light beam which has a first light intensity P1. In the lower light intensity control mode, the light intensity controller 30 obtains a low-level voltage VchL by causing the LD 12 to emit a light beam which has a second light intensity P2, which is lower than the first light intensity P1. The light intensity controller 30 calculates a threshold voltage Vth based on the high-level voltage VchH and the low-level voltage VchL. The light intensity controller 30 obtains a bias voltage Vb, which is smaller than the threshold voltage Vth, and generates the bias current Ib based on the bias voltage Vb. The upper light intensity control mode, the lower light intensity control mode, a method of calculating the bias voltage Vb, and a method of generating the bias current Ib will be described below.

(Upper Light Intensity Control Mode)

The upper light intensity control mode (APC-H), which is a first mode, will be described. In the upper light intensity control mode, the light intensity controller 30 adjusts the value of the drive current Idr which is supplied to the LD 12 so that light entering a photodiode (hereinafter abbreviated as "PD") 14b, which serves as a light receiving portion, has the first light intensity P1, which is a target light intensity. The light intensity of a light beam emitted from the LD 12 is detected by the PD 14b serving as a light intensity detecting portion (light receiving element). A voltage is applied to the PD 14b from a power source Vcc. The PD 14b is provided in the light intensity detecting unit 14 illustrated in FIG. 1. Part of a light beam emitted from the LD 12 is reflected by a half mirror 14a provided in the light intensity detecting unit 14, to thereby enter the PD 14b. The PD 14b receives the partial light beam and outputs a PD current (a signal indicating received light intensity) 15 in an amount which is determined in relation to the light intensity of the received light beam, as a light beam intensity detection result.

The PD current 15 is converted into a voltage V by a variable resistor 34. The voltage V of the PD current 15 is input to a comparator 33. The comparator 33 compares the voltage V of the PD current 15 and an output voltage 56 of a voltage divider 32. The voltage divider 32 divides a reference voltage Vref, which is generated by a reference voltage generating portion 31, at a ratio "n". In the upper light intensity control mode, the voltage divider 32 sets the ratio "n" to 1 (n=1), and outputs the output voltage 56 that is 1/1 of the reference voltage Vref (Vref×1/1).

The output of the comparator 33 is input to an upper sampling circuit 35 and a lower sampling circuit 40. The upper sampling circuit 35 and a first capacitor 36 serve as a high-level voltage sample-and-hold circuit configured to sample and hold the high-level voltage VchH. The lower sampling circuit 40 and a second capacitor 41 serve as a low-level voltage sample-and-hold circuit configured to sample and hold the low-level voltage VchL. The upper sampling circuit 35 (a switch) is controlled by the upper light intensity control signal 62 output from the image controller 501. The lower sampling circuit 40 (a switch) is controlled by the lower light intensity control signal 63 output from the image controller 501. As shown in Table 1, the upper sampling circuit 35 is switched on by the upper light intensity control signal 62 and the lower sampling circuit 40 is switched off by the lower light intensity control signal 63 in the upper light intensity control mode. The upper sampling circuit 35 in the upper light intensity control mode therefore charges or discharges the first capacitor 36, depending on the output of the comparator 33.

Specifically, when the voltage V of the PD current 15 is smaller than the output voltage 56 of the voltage divider 32 (voltage V<reference voltage Vref), the light intensity of a light beam of the LD 12 is lower than the first light intensity P1, and the upper sampling circuit 35 accordingly charges the first capacitor 36. When the voltage V of the PD current 15 is larger than the output voltage 56 of the voltage divider 32 (voltage V>reference voltage Vref), the light intensity of a light beam of the LD 12 is higher than the first light intensity P1, and the upper sampling circuit 35 accordingly discharges the first capacitor 36. The first capacitor 36 samples the high-level voltage VchH in this manner.

The first capacitor 36 is connected to an upper terminal of a changeover switch (single pole double throw switch) 38. A lower terminal of the changeover switch 38 is connected to the second capacitor 41. A common terminal of the changeover switch 38 is connected to a bias voltage generating circuit 43, and to an upper terminal of an upper analog switch 54a of a current stopping circuit (double pole double throw switch) 54. A lower terminal of the upper analog switch 54a of the current stopping circuit 54, which serves as a current stopping unit, is grounded. A common terminal of the upper analog switch 54a is connected to a switching current generating circuit 39. In the upper light intensity control mode, the common terminal of the changeover switch 38 is connected to the upper terminal by the lower light intensity control signal 63, and the common terminal of the current stopping circuit 54 is connected to the upper terminal by the current stop signal 73 as shown in Table 1. The high-level voltage VchH of the first capacitor 36 is therefore applied to the switching current generating circuit 39 via the changeover switch 38 and the current stopping circuit 54. The switching current generating circuit 39 includes a voltage-current converting circuit (V-I). The switching current generating circuit 39 converts the high-level voltage VchH of the first capacitor 36 into an output current 55.

In the upper light intensity control mode, the current stopping circuit 54 is connected to the changeover switch 38 and the switching current generating circuit 39. The operation of the current stopping circuit 54 will be described later. The bias voltage generating circuit 43 is connected to an upper terminal of a lower analog switch 54b of the current stopping circuit 54 via a switch (single pole single throw switch) 44. A lower terminal of the lower analog switch 54b of the current stopping circuit 54 is grounded. A common terminal of the lower analog switch 54b of the current stopping circuit 54 is connected to a bias current generating circuit 45, which includes a voltage-current conversion circuit (V-I). The bias current generating circuit 45 generates the bias current Ib based on the bias voltage Vb, which is calculated by the bias voltage generating circuit 43.

In the upper light intensity control mode where the switch 44 is switched on as shown in Table 1 by the lower light intensity control signal 63, the bias voltage Vb generated by the bias voltage generating circuit 43 is applied to the bias current generating circuit 45. The bias current generating circuit 45 converts the bias voltage Vb into the bias current Ib. The bias current Ib is input to a subtracter 51 and an adder 53. The subtracter 51 subtracts the bias current Ib from the output current 55 of the switching current generating circuit 39 to generate a switching current Isw. A video (VDO) control circuit 46, which is turned on in the upper light intensity control mode as shown in Table 1 by the upper light intensity control signal 62 and the lower light intensity control signal 63, outputs a video signal 47. The video signal 47 in the upper light intensity control mode turns a transistor 52 on. The adder 53 adds the bias current Ib to the switching current Isw to generate the drive current Idr, which is used to drive the LD 12.

In this manner, the light intensity controller 30 in the upper light intensity control mode forms a feedback loop for light intensity control that includes the upper sampling circuit 35 between the LD 12 and the PD 14b, and samples the high-level voltage VchH into the first capacitor 36 so that the light beam of the LD 12 has the first light intensity P1.

(Lower Light Intensity Control Mode)

The lower light intensity control mode (APC-L), which is a second mode, will be described. In the lower light intensity control mode, the light intensity controller 30 adjusts the value of the drive current Idr that is supplied to the LD 12 so that light entering the PD 14b has the second light intensity P2, which is a target light intensity lower than the other target light intensity, i.e., the first light intensity P1. The PD 14b receives, via the half mirror 14a, part of a light beam emitted from the LD 12, and outputs the PD current 15 in an amount that is determined in relation to the light intensity of the received light beam.

The PD current 15 is converted into the voltage V by the variable resistor 34. The voltage V of the PD current 15 is input to the comparator 33. The comparator compares the voltage V of the PD current 15 and the output voltage 56 of the voltage divider 32. The voltage divider 32 divides the reference voltage Vref, which is generated by the reference voltage generating portion 31, at a ratio "n". In the lower light intensity control mode, the voltage divider 32 sets the ratio "n" to 4 (n=4), and outputs the output voltage 56 that is ¼ of the reference voltage Vref (Vref×¼).

The output of the comparator 33 is input to the upper sampling circuit 35 and the lower sampling circuit 40. As shown in Table 1, the upper sampling circuit 35 is switched off by the upper light intensity control signal 62 and the lower sampling circuit 40 is switched on by the lower light intensity control signal 63 in the lower light intensity control mode. The lower sampling circuit 40 in the lower light intensity control mode therefore charges or discharges the second capacitor 41, depending on the output of the comparator 33.

Specifically, when the voltage V of the PD current 15 is smaller than the output voltage 56 of the voltage divider 32 (voltage V<Vref×¼), the light intensity of a light beam of the LD 12 is lower than the second light intensity P2, and the lower sampling circuit 40 accordingly charges the second capacitor 41. When the voltage V of the PD current 15 is larger than the output voltage 56 of the voltage divider 32 (voltage V>Vref×¼), the light intensity of a light beam of the LD 12 is higher than the second light intensity P2, and the lower sampling circuit 40 accordingly discharges the second capacitor 41. The second capacitor 41 samples the low-level voltage VchL in this manner.

The second capacitor 41 is connected to the lower terminal of the changeover switch 38 and to the bias voltage generating circuit 43. The bias voltage generating circuit 43 is connected to the common terminal of the changeover switch 38 and to the switch 44 as well. In the lower light intensity control mode, the common terminal of the changeover switch 38 is connected to the lower terminal by the lower light intensity control signal 63 and the common terminal of the current stopping circuit (setting portion) 54 is connected to the upper terminal by the current stop signal 73 as shown in Table 1. The low-level voltage VchL of the second capacitor 41 is therefore applied to the switching current generating circuit 39 via the changeover switch 38 and the current stopping circuit 54. The switching current generating circuit 39 converts the low-level voltage VchL of the second capacitor 41 into the output current 55.

In the lower light intensity control mode where the switch 44 is switched off as shown in Table 1 by the lower light intensity control signal 63, the bias current generating circuit 45 does not generate the bias current Ib. Consequently, no bias current Ib is supplied to the subtracter 51 and the adder 53, which therefore do not perform the addition and subtraction of the bias current Ib to and from the output current 55 of the switching current generating circuit 39 in the lower light intensity control mode.

The VDO control circuit 46, which is turned on in the lower light intensity control mode as shown in Table 1 by the upper light intensity control signal 62 and the lower light intensity control signal 63, outputs the video signal 47. The video signal 47 in the lower light intensity control mode turns the transistor 52 on. With the subtracter 51 and the adder 53 not performing the addition and subtraction of the bias current Ib to and from the output current 55 of the switching current generating circuit 39, the output current 55 of the switching current generating circuit 39 is supplied as the drive current Idr to the LD 12.

In this manner, the light intensity controller 30 in the lower light intensity control mode forms a feedback loop for light intensity control that includes the lower sampling circuit 40 between the LD 12 and the PD 14b, and samples the low-level voltage VchL into the second capacitor 41 so that the light beam of the LD 12 has the second light intensity P2.

(Bias Voltage Calculation Method)

Figure 3:
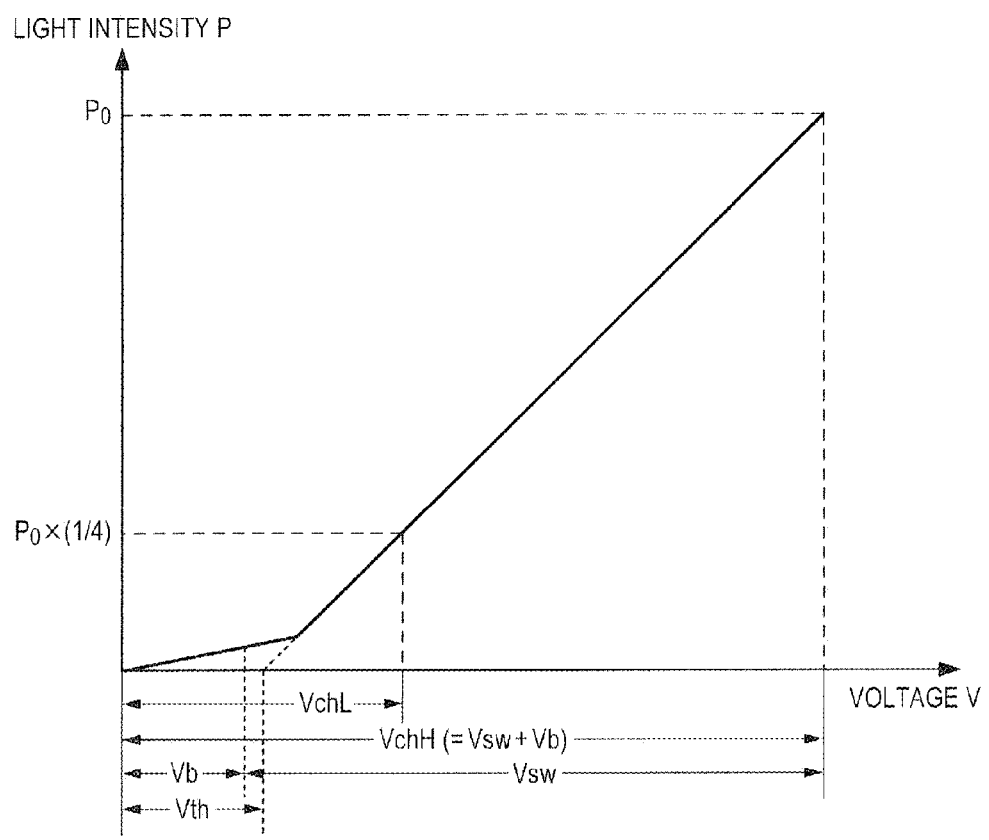
FIG. 3 is a graph for showing a relation between the voltage of a capacitor and the light beam intensity of an LD.

A method of calculating the bias voltage Vb will be described below with reference to FIG. 3. FIG. 3 is a graph for showing a relation between the voltage V of a capacitor and the light intensity P of a light beam of the LD 12. A target light intensity $P_0$ is the light intensity of light for exposing the surface of the photosensitive drum 25. The target light intensity $P_0$ corresponds to the first light intensity P1 of a light beam that is emitted by the LD 12 in the upper light intensity control mode. In the case where the first capacitor 36 is charged to the high-level voltage VchH in the upper light intensity control mode, the light intensity P of the light beam is the first light intensity P1, namely, the target light intensity $P_0$. The target light intensity $P_0 \times \frac{1}{4}$ corresponds to the second light intensity P2 of a light beam which is emitted by the LD 12 in the lower light intensity control mode. In the case where the second capacitor 41 is charged to the low-level voltage VchL in the lower light intensity control mode, the light intensity P of the light beam is the second light intensity P2, namely, the target light intensity $P_0 \times \frac{1}{4}$.

The threshold voltage (light emission start voltage) Vth at which the LD 12 starts laser oscillation is calculated when an image is formed in the constant current control mode described later. The bias voltage generating circuit 43 calculates the threshold voltage Vth from the high-level voltage VchH, which is held by the first capacitor 36, and the low-level voltage VchL, which is held by the second capacitor 41, by Expression (1).

$$(VchH-Vth):(VchL-Vth)=P_0:P_0 \times \tfrac{1}{4} \therefore Vth=(4VchL-VchH)/3 \quad \text{Expression (1)}$$

The bias voltage generating circuit 43 generates the bias voltage Vb by Expression (2) in which the threshold voltage Vth is multiplied by an arbitrary coefficient α equal to or smaller than 1.

$$Vb=\alpha \times Vth(\alpha \le 1) \quad \text{Expression (2)}$$

The second light intensity P2 in the embodiment is set to one fourth of the first light intensity P1. However, the second light intensity P2 is not limited thereto and may be set to an arbitrary value, for example, one third or one fifth of the first light intensity P1. A preferred second light intensity P2 is higher than a light intensity that corresponds to the threshold voltage Vth.

(Bias Current Generating Method)

The bias voltage generating circuit 43 inputs the bias voltage Vb to the bias current generating circuit 45 via the switch 44 and the current stopping circuit 54. The bias current generating circuit 45 having a voltage-current converting circuit converts the bias voltage Vb into the bias current Ib.

(Constant Current Control Mode)

The constant current control mode, which is a light writing mode for forming a latent image by running a light beam over the surface of the photosensitive drum 25, is now described. The light intensity controller 30 operates in the constant current control mode in order to drive the LD 12 in a manner that is indicated by the image signal 22 when an image is formed. In the constant current control mode, the upper sampling circuit 35 is switched off as shown in Table 1 by the upper light intensity control signal 62. This causes the first capacitor 36 to hold the high-level voltage VchH. The lower sampling circuit 40 is switched off by the lower light intensity control signal 63. This causes the second capacitor 41 to hold the low-level voltage VchL.

The changeover switch 38 connects the first capacitor 36 to the bias voltage generating circuit 43 and the current stopping circuit 54. The high-level voltage VchH of the first capacitor 36 is applied to the bias voltage generating circuit 43. The bias voltage generating circuit 43 generates the bias voltage Vb based on the high-level voltage VchH of the first capacitor 36 and the low-level voltage VchL of the second capacitor 41. The bias voltage Vb is input to the bias current generating circuit 45 via the switch 44 and the current stopping circuit 54. The bias current generating circuit 45 converts the bias voltage Vb into the bias current Ib. The bias current Ib is supplied to the subtracter 51 and the adder 53.

The high-level voltage VchH of the first capacitor 36 is also applied to the switching current generating circuit 39 via the changeover switch 38 and the current stopping circuit 54. The switching current generating circuit 39 converts the high-level voltage VchH into the output current 55. The output current 55 is input to the subtracter 51. The subtracter 51 subtracts the bias current Ib from the output current 55 to generate the switching current Isw. The switching current Isw is input to the transistor 52.

The image signal 22 from the image controller 501 is input to the VDO control circuit 46. The VDO control circuit 46 generates the video signal 47 based on the image signal 22. The video signal 47 is input to the transistor 52. The video signal 47 in the constant current control mode is a modulation signal that turns the transistor 52 on or off depending on the image signal 22. The transistor 52 modulates the switching current Isw in a manner that is indicated by the video signal 47. The adder 53 adds the bias current Ib to the modulated switching current Isw to generate the drive current Idr. The drive current Idr is supplied to the LD 12. The drive current Idr is a current in which the bias current Ib is superimposed on the modulated switching current Isw. The bias current Ib is therefore supplied to the LD 12 when an image is formed. The modulated switching current Isw is supplied to the LD 12 in order to emit a light beam to the photosensitive drum 25 at a target light intensity suited to the image signal 22. Supplying the bias current Ib to the LD 12 when an image is formed enhances the light emission responsiveness of the LD 12 to the supplying of the switching current Isw compared to when the bias current Ib is not supplied.

(Initialization Mode)

The initialization mode will be described. The light intensity controller 30 operates in the initialization mode immediately after the image forming apparatus 1 is powered on or when the light scanning apparatus 2 is stopped. The image controller 501 outputs the upper light intensity control signal 62 and the lower light intensity control signal 63 to turn the upper sampling circuit 35 and the lower sampling circuit 40 off, and outputs the discharge signal 64 to turn discharge circuits 37 and 42 on. The discharge circuits 37 and 42 forcibly discharge the first capacitor 36 and the second capacitor 41. This makes the voltages applied to the switching current generating circuit 39 and the bias current generating circuit 45 0 (zero), which means that no drive current Idr is supplied to the LD 12.

(Current Stop Control Mode)

The current stop control mode will be described. When the light scanning apparatus 2 is in operation or can be put into operation, the bias current Ib is supplied to the LD 12 regardless of whether the switching current Isw for forming an image is supplied or not. Supplying the bias current Ib causes power consumption. The embodiment therefore provides the light intensity controller 30 which is capable of cutting off the supply of the drive current Idr (the bias current Ib+the switching current Isw) to the LD 12 when there is no need to drive the LD 12, for the purpose of reducing power consumption.

The current stopping circuit (double pole double throw switch) 54 illustrated in FIG. 2 includes the upper analog switch 54a and the lower analog switch 54b. The upper analog switch 54a connects the switching current generating circuit 39 to the changeover switch 38 or the ground. The lower analog switch 54b connects the bias current generating circuit 45 to the switch 44 or the ground. The image controller 501 inputs the current stop signal 73 to the current stopping circuit 54 when there is no need to supply the bias current Ib to the LD 12. The current stop signal 73 controls the current stopping circuit 54 by following Table 2.

TABLE 2

| | | Connection destination of current stopping circuit 54 |
|---|---|---|
| Current stop signal 73 | L | Ground |
| | H | Changeover switch 38 and switch 44 |

When the current stop signal 73 is at the high level (H), the current stopping circuit 54 connects the switching current generating circuit 39 to the changeover switch 38, and connects the bias current generating circuit 45 to the switch 44. Voltages are applied from the first capacitor 36 and the second capacitor 41 to the switching current generating circuit 39 and the bias current generating circuit 45, thereby supplying the drive current Idr to the LD 12. When the current stop signal 73 is at the low level (L), the current stopping circuit 54 connects both the switching current generating circuit 39 and the bias current generating circuit 45 to the ground at the same time. In this manner, the current stopping circuit 54 cuts off power supply to the switching current generating circuit 39 and the bias current generating circuit 45 when the drive current Idr does not need to be supplied to the LD 12. With the supply of the drive current Idr to the LD 12 cut off, the LD 12 stops emitting light and therefore power consumption can be reduced. In this way, the current stopping circuit 54 can reduce the power consumption of the light intensity controller 30 by stopping the supply of the bias current Ib and the switching current Isw to the LD 12 when there is no need to drive the LD 12.

The image controller 501 transmits the upper light intensity control signal 62, the lower light intensity control signal 63, and the image signal 22 to the light intensity controller 30 in the current stop control mode as well in an attempt to make the light intensity controller 30 operate in the upper light intensity control mode, the lower light intensity control mode, and the constant current control mode. However, the bias current Ib or the drive current Idr is not supplied to the LD 12 because power supply to the switching current generating circuit 39 and the bias current generating circuit 45 is cut off by the current stopping circuit 54. Thus, according to the embodiment, the supply of current to the LD 12 can be stopped by providing a current stop signal generating portion configured to generate the current stop signal 73 in the image controller 501, which is provided in the main body of the image forming apparatus 1, without altering the image controller 501 much.

First Modification Example

Figure 4:
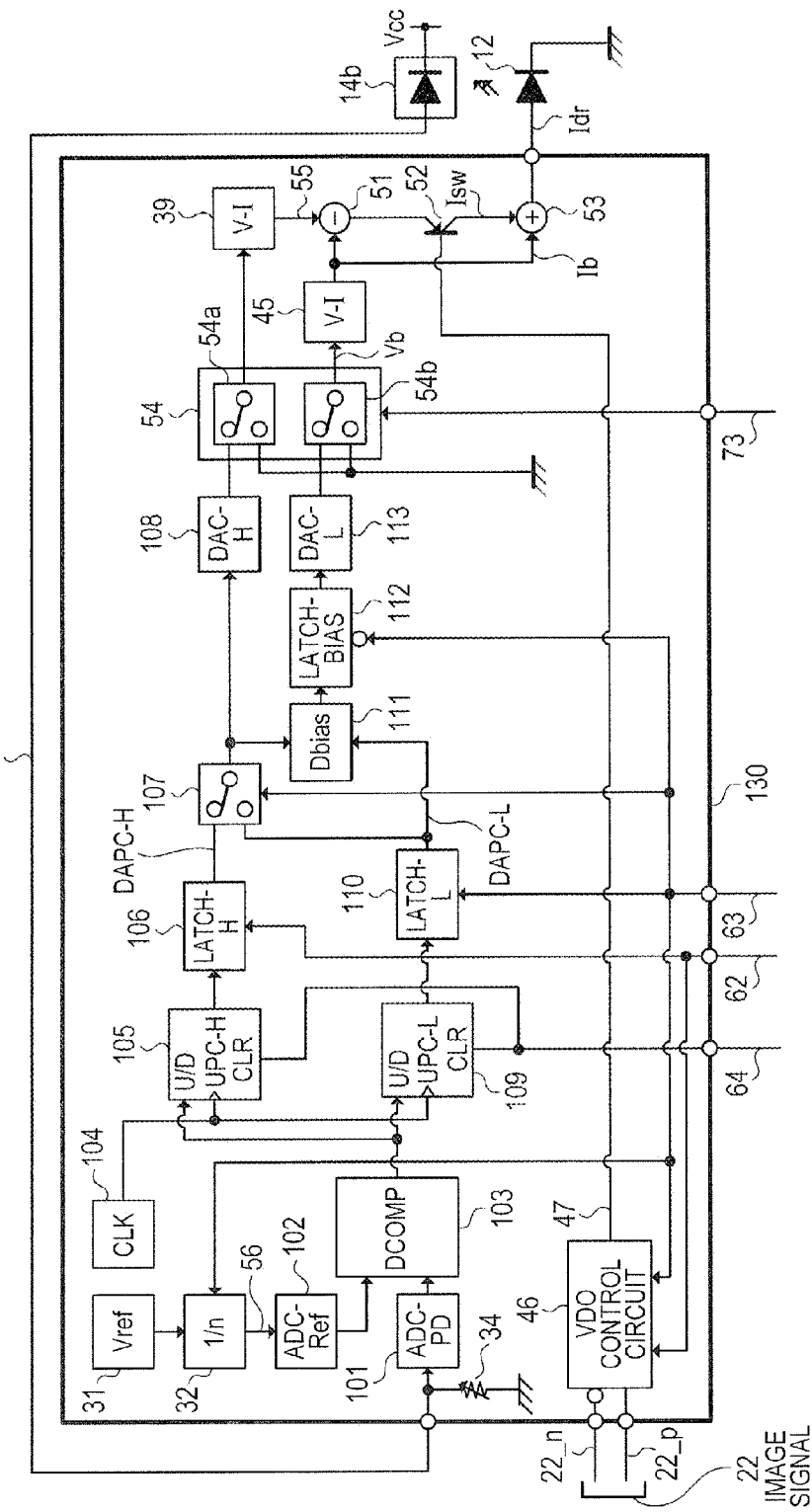
FIG. 4 is a block diagram of a light intensity controller according to a first modification example of the first embodiment.

A first modification example of the first embodiment will be described next. FIG. 4 is a block diagram of a light intensity controller 130 according to the first modification example of the first embodiment. The light intensity controller 130 of the first modification example is made up of digital circuits. Components of the light intensity controller 130 of the first modification example that are the same as those of the light intensity controller 30 illustrated in FIG. 2 are denoted by the same reference symbols, and descriptions thereof are omitted.

The association relation between a component of the light intensity controller 30 illustrated in FIG. 2 and a component of the light intensity controller 130 illustrated in FIG. 4 is shown in Table 3.

TABLE 3

| Light intensity controller 30 of FIG. 2 | | Light intensity controller 130 of FIG. 4 | |
|---|---|---|---|
| First capacitor 36 | Charge/discharge | First counter 105 | Up/down |
| Second capacitor 41 | Charge/discharge | Second counter 109 | Up/down |
| Upper sampling circuit 35 | ON/OFF | First latch 106 | Through/latch |
| Lower sampling circuit 40 | ON/OFF | Second latch 110 | Through/latch |
| Switch 44 | ON/OFF | Bias latch 112 | Through/latch |

(Upper Light Intensity Control Mode)

In the upper light intensity control mode, the light intensity controller 130 adjusts the value of the drive current Idr that is supplied to the LD 12 so that the LD 12 emits a light beam having the first light intensity P1. The light intensity of the light beam emitted from the LD is detected by the PD 14b. The PD 14b receives the light beam and outputs the PD current 15 in an amount that is determined in relation to the light intensity of the received light beam. The PD current 15 is converted into the voltage V by the variable resistor 34. The voltage V is converted into a digital value ADC-PD by an analog-to-digital converter 101. The digital value ADC-PD is input to a digital comparator (DCOMP) 103.

The voltage divider 32 divides the reference voltage Vref generated by the reference voltage generating circuit 31 at the ratio "n". In the upper light intensity control mode, the voltage divider 32 sets the ratio "n" to (n=1), and outputs the output voltage 56 that is 1/1 of the reference voltage Vref (Vref×1/1). The output voltage 56 of the voltage divider 32 is converted into a digital value ADC-Ref by an analog-to-digital converter 102. The digital value ADC-Ref is input to the digital comparator 103.

The digital comparator 103 compares the digital value ADC-PD of the analog-to-digital converter 101 and the digital value ADC-Ref of the analog-to-digital converter 102 to generate an up signal or a down signal.

Specifically, when the digital value ADC-PD is smaller than the digital value ADC-Ref (ADC-PD<ADC-Ref), the light beam of the LD 12 has a light intensity lower than the first light intensity P1, and the digital comparator 103 accordingly outputs an up signal. The up signal is input to a first up/down counter (hereinafter referred to as "first counter") 105, which then increases its count. This corresponds to charging the first capacitor 36 of the light intensity controller 30 of FIG. 2. When the digital value ADC-PD is larger than the digital value ADC-Ref (ADC-PD>ADC-Ref), the light beam of the LD 12 has a light intensity higher than the first light intensity P1, and the digital comparator 103 accordingly outputs a down signal. The down signal is input to the first counter 105, which then decreases its count. This corresponds to discharging the first capacitor 36 of the light intensity controller 30 of FIG. 2. The first counter 105 samples a high-level count DAPCH in this manner.

(Lower Light Intensity Control Mode)

In the lower light intensity control mode, the light intensity controller 130 adjusts the value of the drive current Idr that is supplied to the LD 12 so that the LD 12 emits a light beam having the second light intensity P2 that is smaller than the first light intensity P1. The PD 14b receives the light beam and outputs the PD current 15 in an amount that is determined in relation to the light intensity of the received light beam. The PD current 15 is converted into the voltage V by the variable resistor 34. The voltage V is converted into the digital value ADC-PD by the analog-to-digital converter 101. The digital value ADC-PD is input to the digital comparator 103.

The voltage divider 32 sets the ratio "n" to 4 (n=4), and outputs the output voltage 56 which is ¼ of the reference voltage Vref (Vref×¼). The output voltage 56 of the voltage divider 32 is converted into the digital value ADC-Ref by the analog-to-digital converter 102. The digital value ADC-Ref is input to the digital comparator 103.

The digital comparator 103 compares the digital value ADC-PD of the analog-to-digital converter 101 and the digital value ADC-Ref of the analog-to-digital converter 102 to generate an up signal or a down signal. The up signal or the down signal is input to a second up/down counter (hereinafter referred to as "second counter") 109. The second counter 109 samples a low-level count DAPCL in the same manner as in the upper light intensity control mode.

(Bias Data Calculation Method)

A first latch 106 latches the high-level count DAPCH of the first counter 105 in response to the upper light intensity control signal 62. The high-level count DAPCH is input to a first digital-analog converter (DAC-H) 108 and a bias data generating circuit (Dbias) 111 via a changeover switch 107. A second latch 110 latches the low-level count DAPCL of the second counter 109 in response to the lower light intensity control signal 63. The low-level count DAPCL is input to the bias data generating circuit 111.

The bias data generating circuit 111 calculates threshold data Dth from the high-level count DAPCH of the first latch 106 and the low-level count DAPCL of the second latch 110 by Expression (3).

$$(DAPCH-Dth):(DAPCL-Dth)=P_0:P_0\times\frac{1}{4} \therefore Dth=(4DAPCL-DAPCH)/3 \quad \text{Expression (3)}$$

The bias data generating circuit 111 generates bias data Db by Expression (4) in which the threshold data Dth is multiplied by an arbitrary coefficient α equal to or smaller than 1.

$$Db=\alpha\times Dth(\alpha\leq1) \quad \text{Expression (4)}$$

The high-level count DAPCH of the first latch 106 corresponds to the high-level voltage VchH, and the low-level count DAPCL of the second latch 110 corresponds to the low-level voltage VchL. The threshold data Dth corresponds to the threshold voltage Vth, and the bias data Db corresponds to the bias voltage Vb. The relation between the light intensity P and a count is the same as the relation between the light intensity P and the voltage V which is shown in FIG. 3.

(Bias Current Generating Method)

The bias data generating circuit 111 outputs the bias data Db to a second digital-analog converter (DAC-L) 113 via a bias latch (LATCH-BIAS) 112. The second digital-analog converter 113 converts the bias data Db into the bias voltage Vb. The second digital-analog converter 113 inputs the bias voltage Vb to the bias current generating circuit 45 via the current stopping circuit 54. The bias current generating circuit 45 having a voltage-current conversion circuit converts the bias voltage Vb into the bias current Ib.

(Constant Current Control Mode)

The light intensity controller 130 in the constant current control mode operates substantially the same way as the light intensity controller 30 of FIG. 2 does in the constant current control mode. The changeover switch 107 connects the first latch 106 to the bias data generating circuit 111 and the first digital-analog converter 108. The first digital-analog converter 108 converts the high-level count DAPCH of the first latch 106 into an analog voltage. The analog voltage of the first digital-analog converter 108 is applied to the switching current generating circuit 39 via the current stopping circuit 54. The bias voltage Vb of the second digital-analog converter 113 is input to the bias current generating circuit 45 via the current stopping circuit 54. The subsequent operation is substantially the same as the operation of the light intensity controller 30, and therefore a description thereof is omitted.

(Initialization Mode)

The discharge circuit 37 and the discharge circuit 42 of FIG. 2 correspond to a clear function (CLR) of the first counter 105 and a clear function (CLR) of the second counter 109, respectively. The first counter 105 clears the count of the first counter 105 to 0 (zero) in response to the discharge signal 64. The second counter 109 clears the count of the second counter 109 to 0 (zero) in response to the discharge signal 64. This makes the voltages applied to the switching current generating circuit 39 and the bias current generating circuit 45 0 (zero), which means that no drive current Idr is supplied to the LD 12.

(Current Stop Control Mode)

Similarly to the light intensity controller 30 of FIG. 2, the light intensity controller 130 of the first modification example cuts off the supply of the drive current Idr (the bias current Ib+the switching current Isw) to the LD 12 when there is no need to drive the LD 12. The light intensity controller 130 operates in the current stop control mode in response to the current stop signal 73 that is at the low level (L). When the current stop signal 73 is at the low level (L), the current stopping circuit 54 grounds both the switching current generating circuit 39 and the bias current generating circuit 45. This stops voltage application to the switching current generating circuit 39 and the bias current generating circuit 45. In this manner, the current stopping circuit 54 cuts off power supply to the switching current generating circuit 39 and the bias current generating circuit 45 when the drive current Idr does not need to be supplied to the LD 12. The current stopping circuit 54 can reduce the power consumption of the light intensity controller 130 by stopping the supply of the bias current Ib to the LD 12 when there is no need to drive the LD 12.

Second Modification Example

Figure 5:
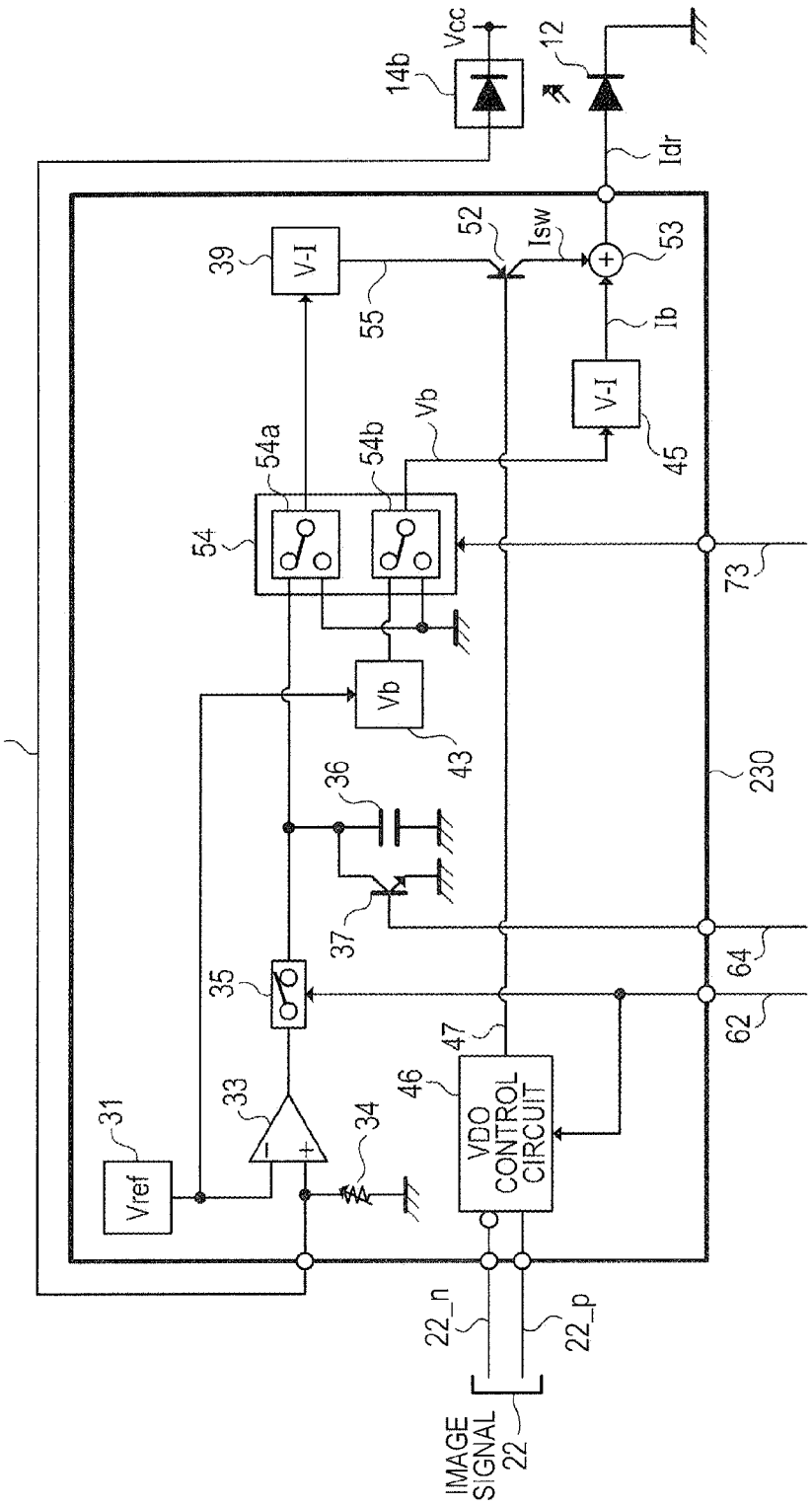
FIG. 5 is a block diagram of a light intensity controller according to a second modification example of the first embodiment.

A second modification example of the first embodiment will be described next. FIG. 5 is a block diagram of a light intensity controller 230 according to the second modification example of the first embodiment. The light intensity controller 230 of the second modification example controls the light intensity of light by a fixed bias method in which the bias voltage Vb is a fixed voltage. Components of the light intensity controller 230 of the second modification example that are the same as those of the light intensity controller 30 illustrated in FIG. 2 are denoted by the same reference symbols, and descriptions thereof are omitted.

In the light intensity controller 230 using the fixed bias method, the bias voltage generating circuit 43 converts the reference voltage Vref generated by the reference voltage generating portion 31 into the bias voltage Vb that has an arbitrary fixed value. The fixed bias voltage Vb is applied to the bias current generating circuit 45 via the current stopping circuit 54. The bias current generating circuit 45 converts the fixed bias voltage Vb into the bias current Ib that is a fixed current. The lower sampling circuit 40, the second capacitor 41, the discharge circuit 42, and the switch 44, which are needed in the light intensity controller 30 of FIG. 2 to generate the bias voltage Vb that is variable, are accordingly omitted from the light intensity controller 230 of FIG. 5. The rest of the components of the light intensity controller 230 are the same as those of the light intensity controller 30 of FIG. 2, and therefore descriptions thereof are omitted.

(Target Light Intensity Control Mode)

In a target light intensity control mode, the light intensity controller 230 adjusts the value of the drive current Idr that is supplied to the LD 12 so that the LD 12 emits a light beam that has the first light intensity (target light intensity) P1.

(Current Stop Control Mode)

The current stopping circuit 54 connects both the switching current generating circuit 39 and the bias current generating circuit 45 to the ground at the same time based on the current stop signal 73. In this manner, the current stopping circuit 54 cuts off power supply to the switching current generating circuit 39 and the bias current generating circuit 45 when the drive current Idr does not need to be supplied to the LD 12. The current stopping circuit 54 can reduce the power consumption of the light intensity controller 230 by stopping the supply of the fixed bias current Ib and the switching current Isw to the LD 12 when there is no need to drive the LD 12.

Third Modification Example

Figure 6:
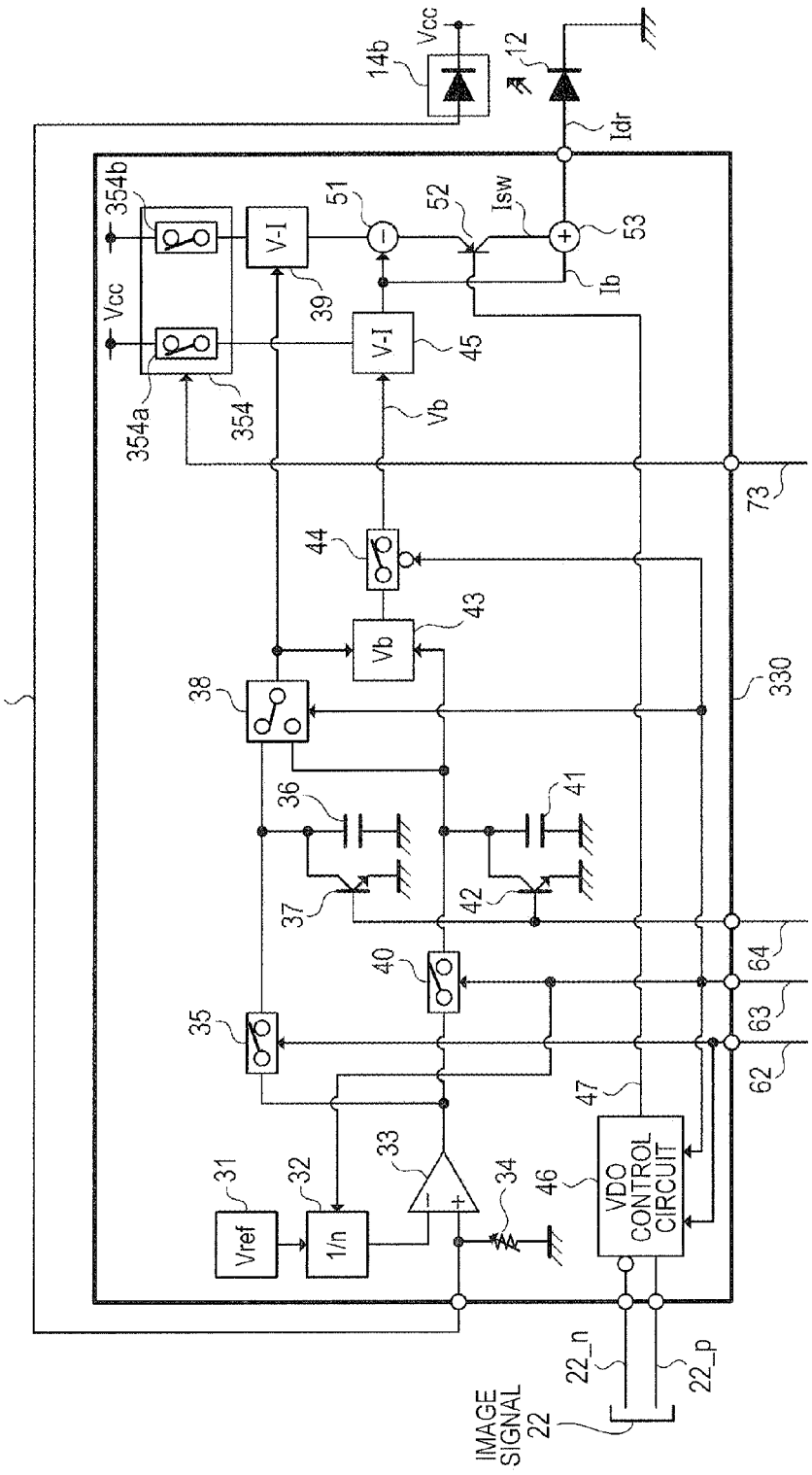
FIG. 6 is a block diagram of a light intensity controller according to a third modification example of the first embodiment.

A third modification example of the first embodiment will be described next. FIG. 6 is a block diagram of a light intensity controller 330 according to the third modification example of the first embodiment. The light intensity controller 330 of the third modification example includes a current stopping circuit (double pole single throw switch) 354 configured to cut off voltages that are applied to the switching current generating circuit 39 and the bias current generating circuit 45 from their respective power sources Vcc. The current stopping circuit (setting portion) 354 is capable of cutting off the supply of the drive current Idr to the LD 12 when there is no need to supply the drive current Idr to the LD 12. Components of the light intensity controller 330 of the third modification example that are the same as those of the light intensity controller 30 illustrated in FIG. 2 are denoted by the same reference symbols, and descriptions thereof are omitted.

The current stopping circuit 354 illustrated in FIG. 6 includes two analog switches 354a and 354b. One analog switch 354a is provided between the bias current generating circuit 45 and the corresponding power source Vcc. The other analog switch 354b is provided between the switching current generating circuit 39 and the corresponding power source Vcc. To cut off the drive current Idr supplied to the LD 12, the current stopping circuit 354 cuts off power supply to the switching current generating circuit 39 and the bias current generating circuit 45 from the power sources Vcc based on the current stop signal 73. The current stopping circuit 354 can thus reduce the power consumption of the light intensity controller 330 by stopping the supply of the bias current Ib and the switching current Isw to the LD 12 when there is no need to drive the LD 12.

In the light intensity controller 30 of FIG. 2 and the light intensity controller 330 of FIG. 6, the same effects as those of the current stopping circuits 54 and 354 can be obtained by turning the discharge circuits 37 and 42 on. The discharge circuits 37 and 42 forcibly discharge the first capacitor 36 and the second capacitor 41 based on the discharge signal 64. The discharge signal 64 in this case corresponds to the current stop signal 73. Executing the discharge with the use of the discharge circuits 37 and 42 stops the supply of the bias current Ib and the switching current Isw to the LD 12 when there is no need to drive the LD 12, thereby reducing the power consumption of the light intensity controllers 30 and 330.

Second Embodiment

Next, a second embodiment will be described. Components of the second embodiment which are the same as those of the first embodiment are denoted by the same reference symbols, and descriptions thereof are omitted. The image forming apparatus 1 and the light scanning apparatus 2 according to the second embodiment are the same as those of the first embodiment, and hence descriptions thereof are omitted. A laser drive portion 211 of the second embodiment differs from the laser drive portion 11 of the first embodiment. The following description focuses on the laser drive portion 211 of the second embodiment.

(Laser Drive Portion)

Figure 7:
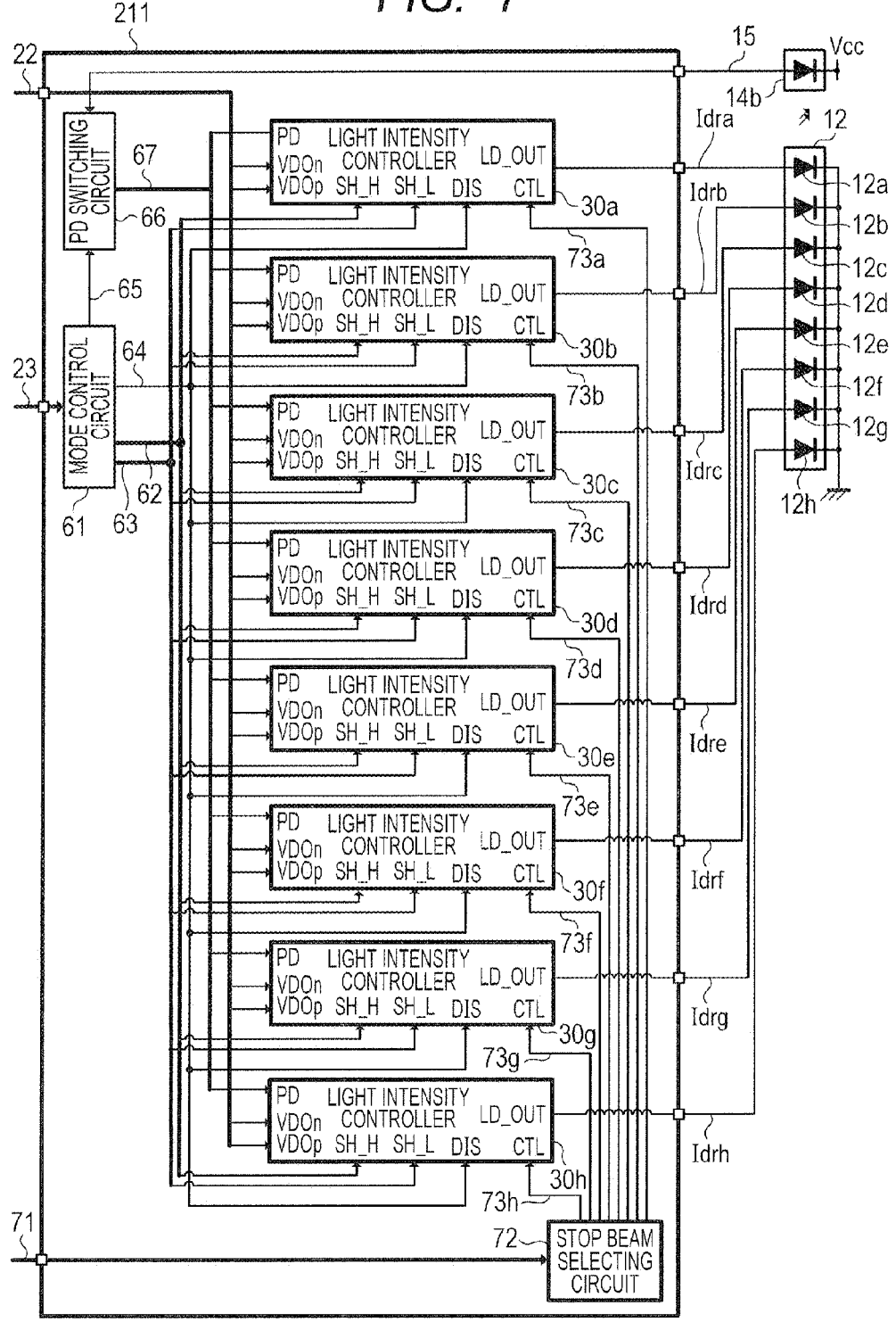
FIG. 7 is a block diagram of a laser drive portion according to a second embodiment of the present invention.

FIG. 7 is a block diagram of the laser drive portion 211 according to the second embodiment. The laser drive portion 211 is a laser driver IC provided on the laser drive substrate 10 of each light scanning apparatus 2. The laser drive portion 211 includes a plurality of light intensity controllers 30, a mode control circuit 61, a PD switching circuit 66, and a stop beam selecting circuit 72. The LD 12 in the embodiment emits eight light beams, and has eight light emitting points 12a, 12b, 12c, 12d, 12e, 12f, 12g, and 12h. The LD 12 may instead be configured to have as many light emitting points as needed to emit nine or more light beams, or seven or less light beams. A preferred LD 12 may be, for example, a vertical cavity surface emitting laser (VCSEL).

The laser drive portion 211 has as many light intensity controllers (drive portions) 30 as the number of the light emitting points 12a to 12h of the LD 12 (here, 30a, 30b, 30c, 30d, 30e, 30f, 30g, and 30h). Specifically, eight light intensity controllers 30a, 30b, 30c, 30d, 30e, 30f, 30g, and 30h are connected to eight light emitting points 12a, 12b, 12c, 12d, 12e, 12f, 12g, and 12h, respectively. The light intensity controllers 30 (30a to 30h) are the same as the light intensity controller 30 of the first embodiment which is illustrated in FIG. 2, and therefore a description thereof is omitted. The light intensity controllers 30 (30a to 30h) may instead be the same as one of the light intensity controllers 130, 230, and 330 according to the first modification example, second modification example, and third modification example of the first embodiment.

The mode control circuit 61 is configured to generate upper light intensity control signals 62 (62a to 62h), lower light intensity control signals 63 (63a to 63h), and the discharge signal 64 based on a laser control signal 23, which is input from the image controller 501. The upper light intensity control signals 62 (62a to 62h), the lower light intensity control signals 63 (63a to 63h), and the discharge signal 64 are input to the corresponding light intensity controllers 30 (30a to 30h) via a bus. The mode control circuit 61 is also configured to output a PD switching signal 65 to the PD switching circuit 66. The PD switching circuit 66 is configured to receive the PD current 15 from the PD 14b, which receives light beams output respectively from the light emitting points 12a to 12h, and to output the PD current 15 selectively to the corresponding light intensity controllers 30 (30a to 30h) via a bus 67 based on the PD switching signal 65.

The stop beam selecting circuit 72, which serves as a light emitting point selector, is configured to generate current stop signals 73 (73a to 73h) based on a current control signal (light beam selecting signal) 71, which is input from the image controller 501 serving as a light beam selector. The current control signal 71 is a serial signal output from the image controller 501. The current control signal 71 may instead be a parallel signal output from the image controller 501. For example, in the case where the sheet S is switched from plain paper to thick paper, fixing a toner image to thick paper requires a large amount of heat and the process speed is therefore lowered. In this case, the number of light beams output from the LD 12 is reduced to a number suited to the lowered process speed. For example, in the case of reducing the number of light beams that are output from the LD 12 from eight to six to accommodate a drop in process speed, the current control signal 71 which instructs a reduction in light beam count from eight to six is input to the stop beam selecting circuit 72. The current control signal 71 which instructs a change in the number of light beams output from the LD 12 is input to the stop beam selecting circuit 72 also when the resolution of an image is changed.

The stop beam selecting circuit 72 generates the current stop signals 73 (73a to 73h) based on the current control signal 71. For each of the light intensity controllers 30 (30a to 30h), the stop beam selecting circuit 72 determines whether the light intensity controller 30 is permitted to supply the corresponding drive current Idr (Idra to Idrh) to the corresponding light emitting point (12a to 12h), based on the current control signal 71, and inputs the corresponding current stop signal 73 (73a to 73h) that is at the high level (H) to the light intensity controller 30 that is permitted to supply the drive current Idr. The stop beam selecting circuit 72 also determines, based on the current control signal 71, for each of the light intensity controllers 30 (30a to 30h), whether the light intensity controller 30 is to stop supplying the corresponding drive current Idr (Idra to Idrh) to the corresponding light emitting point (12a to 12h), and inputs the corresponding current stop signal 73 (73a to 73h) that is at the low level (L) to the light intensity controller 30 that is to stop supplying the drive current Idr. When the current stop signal 73 (73a to 73h) which is at the low level (L) is input to the corresponding light intensity controller 30 (30a to 30h), the current stopping circuit 54 connects both the switching current generating circuit 39 and the bias current generating circuit 45 to the ground at the same time. This stops the supply of the bias current Ib and the switching current Isw to the corresponding light emitting point (12a to 12h), thereby being capable of reducing the power consumption of the light intensity controller 30 (30a to 30h).

Figures 8, 8A, 8B:
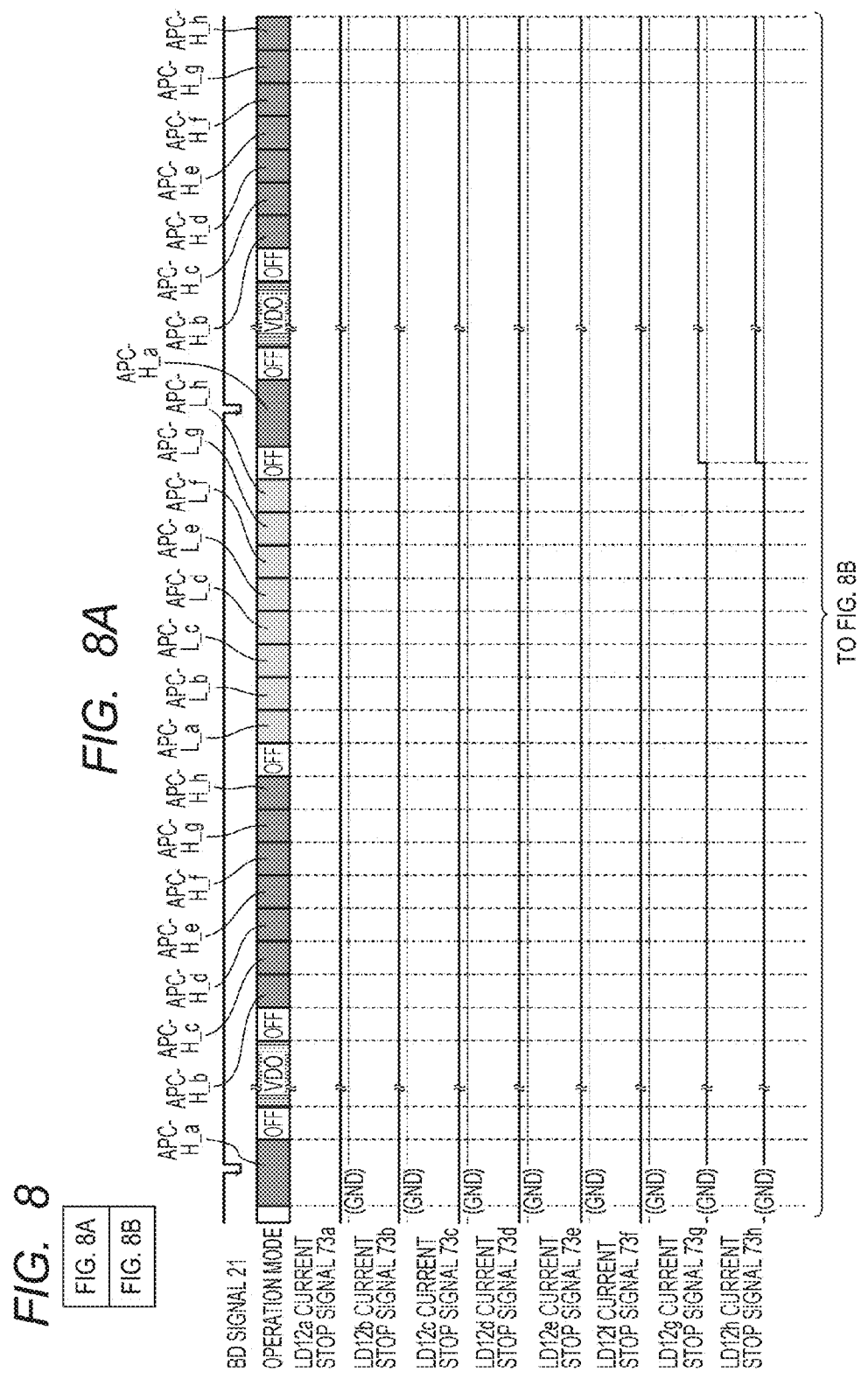

FIG. 8, comprised collectively of FIGS. 8A and 8B, is a timing chart for illustrating the relations between the current stop signals 73 (73a to 73h) and the drive currents Idr (Idra to Idrh) in the second embodiment. In the laser control mode where the light scanning apparatus 2 is driven, the light intensity controllers 30 (30a to 30h) are all operating in the upper light intensity control mode (APC-H), the lower light intensity control mode (APC-L), and the constant current control mode. However, the supply of the drive currents Idrg and Idrh to the light emitting points 12g and 12h is stopped because the current stop signals 73g and 73h that are at the low level (L) are input to the light intensity controllers 30g and 30h as illustrated in FIG. 8. The current stop signals 73g and 73h are switched from the low level (L) to the high level (H), thereby canceling the stopping of the currents, and then starting the supply of the drive currents Idrg and Idrh.

According to the embodiment, the stop beam selecting circuit 72 is capable of selectively stopping the supply of the drive currents Idr to the plurality of light emitting points 12a to 12h. The number of light beams can therefore be changed in the laser control mode of the light scanning apparatus 2 without changing the operation mode of the plurality of light intensity controllers 30 from which laser beams are emitted.

The image controller 501 transmits the upper light intensity control signals 62, the lower light intensity control signals 63, and the image signal 22 to the light intensity controllers 30 in the current stop control mode as well in an attempt to make the light intensity controllers 30 operate in the upper light intensity control mode, the lower light intensity control mode, and the constant current control mode. According to the embodiment, however, current supply to selected light emitting points of the LD 12 can be stopped by providing a current control signal generating portion configured to generate the current control signal 71 in the image controller 501, which is provided in the main body of the image forming apparatus 1, without altering the image controller 501 much. The selected light emitting points of the LD 12 stop receiving current supply during image forming, and therefore do not emit light.

Third Embodiment

Next, a third embodiment will be described. Components of the third embodiment which are the same as those of the first embodiment or the second embodiment are denoted by the same reference symbols, and descriptions thereof are omitted. The image forming apparatus 1 and the light scanning apparatus 2 according to the third embodiment are the same as those of the first embodiment, and hence descriptions thereof are omitted. A laser drive portion 311 of the third embodiment differs from the laser drive portion 211 of the second embodiment. The following description focuses on the laser drive portion 311 of the third embodiment.

Figure 9:
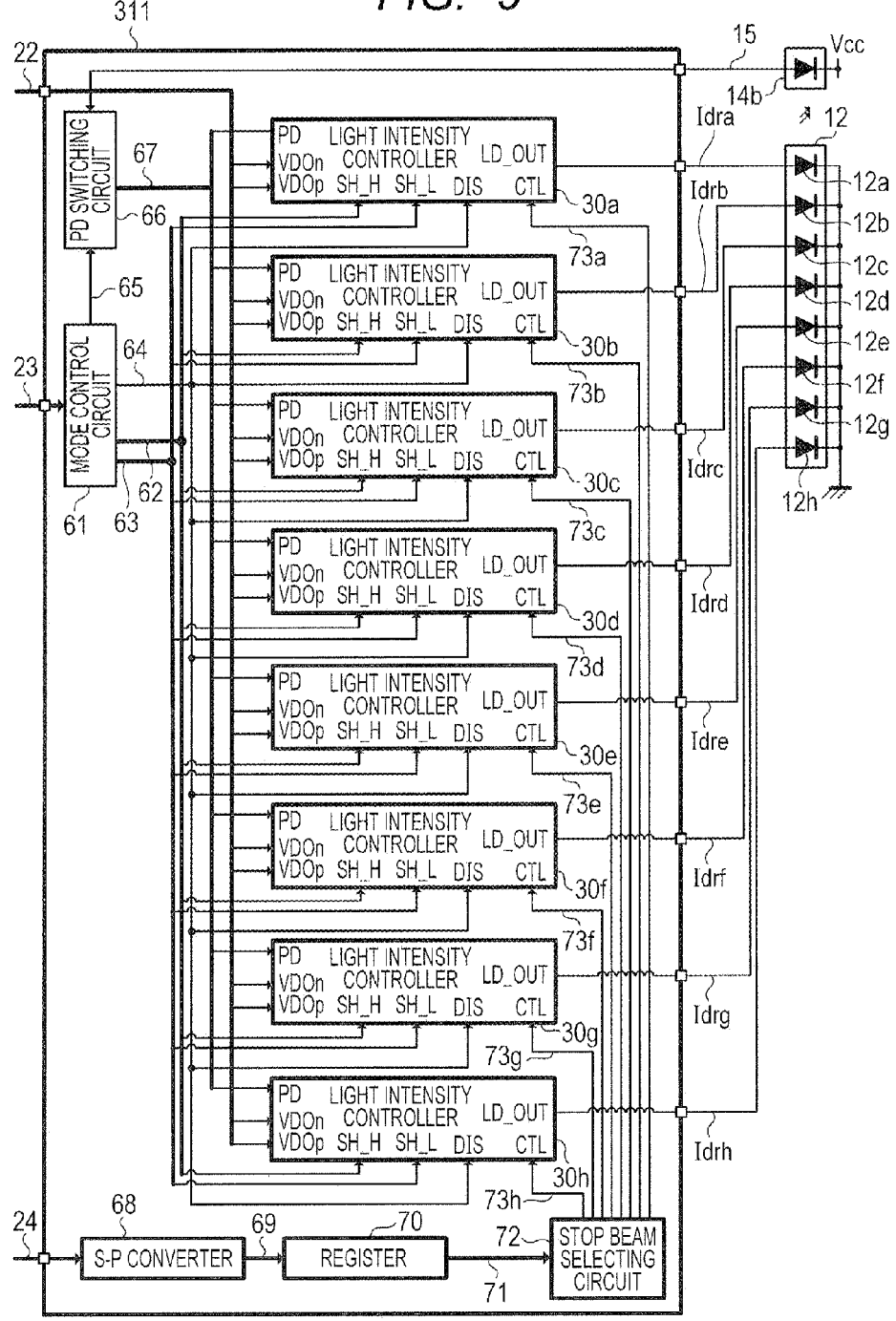
FIG. 9 is a block diagram of a laser drive portion according to a third embodiment of the present invention.

FIG. 9 is a block diagram of the laser drive portion 311 according to the third embodiment. The laser drive portion 311 is a laser driver IC provided on the laser drive substrate 10 of each light scanning apparatus 2. The LD 12 in the embodiment emits eight light beams, and has eight light emitting points 12a, 12b, 12c, 12d, 12e, 12f, 12g, and 12h. The LD 12 may instead be configured to have as many light emitting points as needed to emit nine or more light beams, or seven or less light beams.

A plurality of light intensity controllers 30 (30a, 30b, 30c, 30d, 30e, 30f, 30g, and 30h) connected to the plurality of light emitting points 12a to 12h of the LD 12 are the same as the light intensity controller 30 of the first embodiment which is illustrated in FIG. 2, and therefore a description thereof is omitted. The light intensity controllers 30 (30a to 30h) may instead be the same as one of the light intensity controllers 130, 230, and 330 according to the first modification example, second modification example, and third modification example of the first embodiment.

The laser drive portion 311 of the third embodiment differs from the laser drive portion 211 of the second embodiment in which the laser drive portion 311 of the third embodiment includes a serial-parallel (S-P) converter 68 and a register (storage) 70. The serial-parallel (S-P) converter 68 is configured to store in the register 70 a value 69, which is transmitted by a serial signal 24 input from the image controller 501. The value transmitted by the serial signal 24 contains number information indicating which light emitting points out of the light emitting points 12a to 12h of the LD 12 are to stop receiving the drive current Idr.

The register 70 is configured to generate the current control signal 71 based on the value 69. The current control signal 71 is input to the stop beam selecting circuit 72. The stop beam selecting circuit 72 generates the current stop signals 73 (73a to 73h) based on the current control signal 71, which is generated based on the value 69 stored in the register 70. For each of the light intensity controllers 30 (30a to 30h), the stop beam selecting circuit 72 determines whether the light intensity controller 30 is permitted to supply the corresponding drive current Idr (Idra to Idrh) to the corresponding light emitting point (12a to 12h), based on the current control signal 71, and inputs the corresponding current stop signal 73 (73a to 73h) which is at the high level (H) to the light intensity controller 30 which is permitted to supply the drive current Idr. The stop beam selecting circuit 72 also determines, based on the current control signal 71, for each of the light intensity controllers 30 (30a to 30h), whether the light intensity controller 30 is to stop supplying the corresponding drive current Idr (Idra to Idrh) to the corresponding light emitting point (12a to 12h), and inputs the corresponding current stop signal 73 (73a to 73h) which is at the low level (L) to the light intensity controller 30 that is to stop supplying the drive current Idr. When the current stop signal 73 (73a to 73h) which is at the low level (L) is input to the corresponding light intensity controller 30 (30a to 30h), the current stopping circuit 54 connects both the switching current generating circuit 39 and the bias current generating circuit 45 to the ground at the same time. This stops the supply of the bias current Ib and the switching current Isw to the corresponding light emitting point (12a to 12h), thereby being capable of reducing the power consumption of the light intensity controller 30 (30a to 30h).

According to the embodiment, the image controller 501 can write information indicating which light emitting points of the LD 12 are to stop receiving the drive current, in the register 70 with the use of the serial signal 24. The number of light beams emitted from the LD 12 can thus be switched from outside the laser drive portion 311.

The image controller 501 transmits the upper light intensity control signals 62, the lower light intensity control signals 63, and the image signal 22 to the light intensity controllers 30 in the current stop control mode as well in an attempt to make the light intensity controllers 30 operate in the upper light intensity control mode, the lower light intensity control mode, and the constant current control mode. According to the embodiment, however, current supply to selected light emitting points of the LD 12 can be stopped by providing the image controller 501 with a serial signal generating portion configured to generate a serial signal containing the number information of the light emitting points 12a to 12h, without altering the image controller 501 much.

Fourth Embodiment

Next, a fourth embodiment will be described. Components of the fourth embodiment which are the same as those of the first embodiment, the second embodiment, or the third embodiment are denoted by the same reference symbols, and descriptions thereof are omitted. The image forming apparatus 1 and the light scanning apparatus 2 according to the fourth embodiment are the same as those of the first embodiment, and hence descriptions thereof are omitted. The fourth embodiment deals with the current stop control mode of the light intensity controllers 30, 130, 230, and 330 according to the first embodiment, and of the light intensity controllers 30 (30a to 30h) provided in the laser drive portions 211 and 311 of the second embodiment and the third embodiment. A method of canceling the cessation of the supply of the drive current Idr to the LD 12 is described, which prevents damage to the LD 12 from a supply of an excessive drive current Idr to the LD 12 at the time the cessation of the supply of the drive current Idr to the LD12 is cancelled.

Figure 10A:
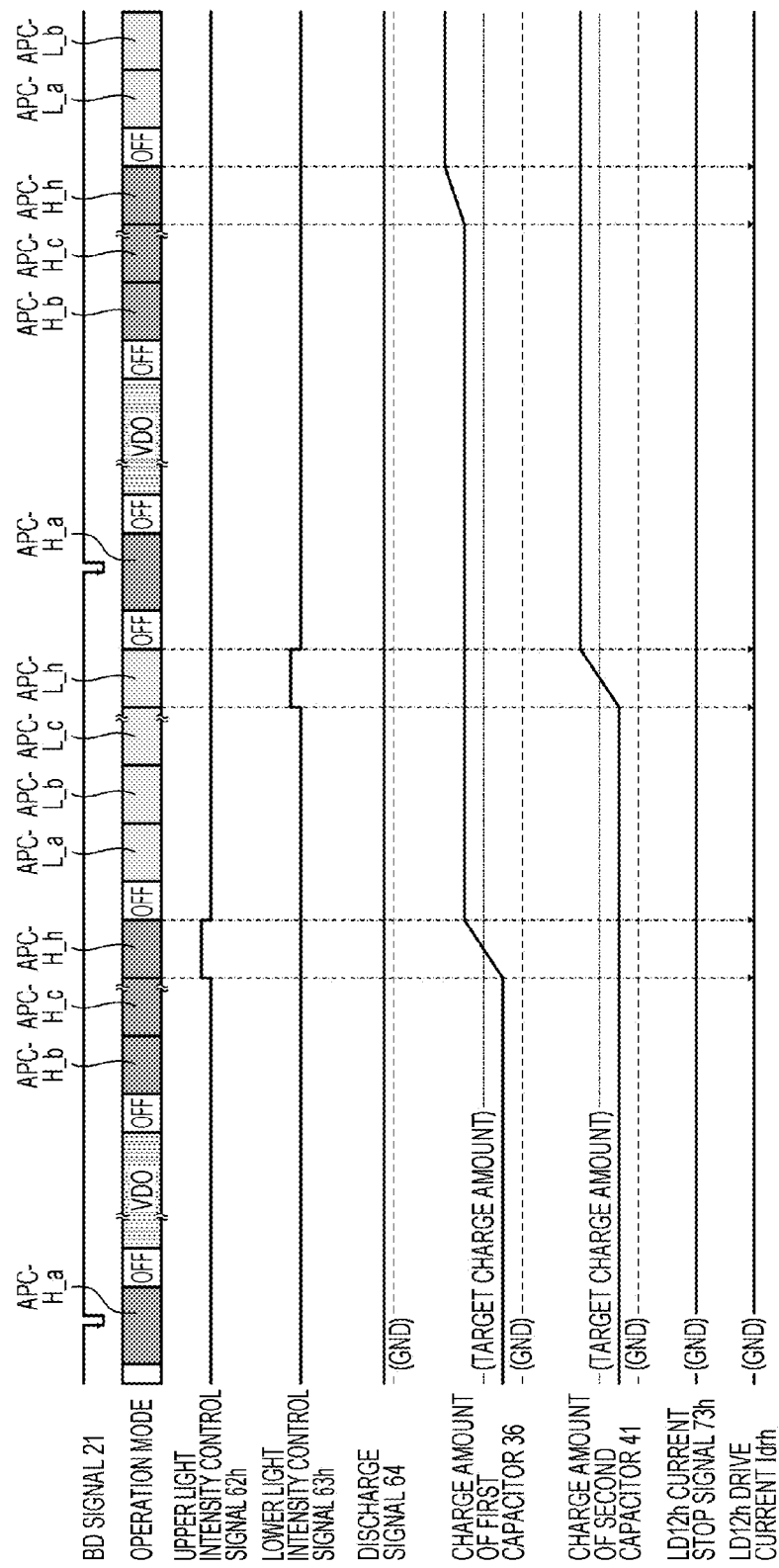
FIG. 10A and FIG. 10B are timing charts for illustrating a method of canceling the cessation of drive current supply to an LD according to a fourth embodiment of the present invention.
Figure 10B:
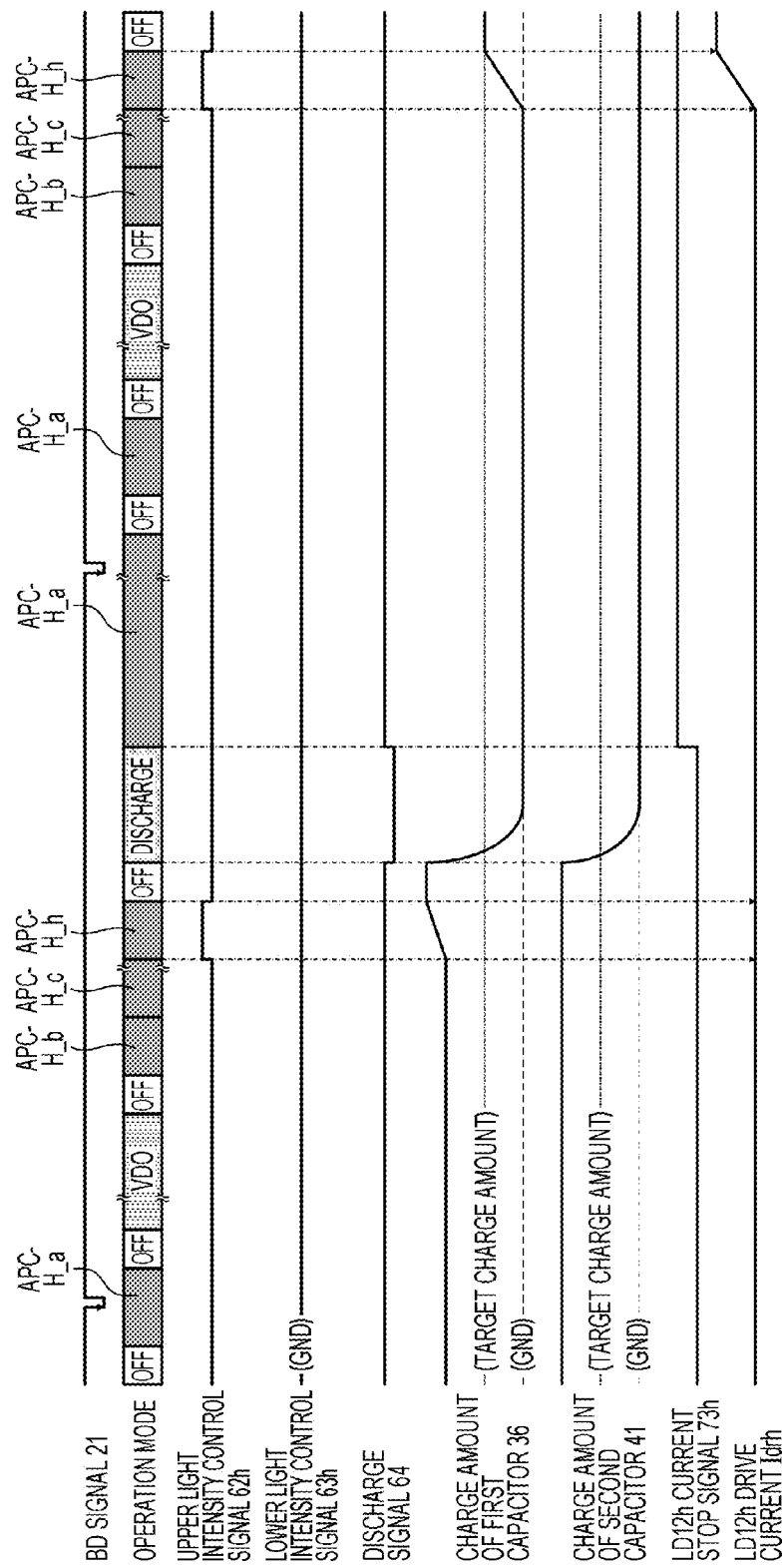

FIG. 10A and FIG. 10B are timing charts for illustrating how the cessation of the supply of the drive current Idr to the LD 12 is cancelled according to the fourth embodiment. The description given here takes as an example the eighth light emitting point 12h in the laser drive portion 211 of the second embodiment which is illustrated in FIG. 7. The description takes the light intensity controller 30 which is illustrated in FIG. 2 as an example of the light intensity controller 30h, which executes the light intensity control of the light emitting point 12h.

Illustrated in FIG. 10A is a relation between the charge amount of the first capacitor 36, the charge amount of the second capacitor 41, and the drive current Idrh in the light intensity controller 30h when the drive current Idrh is stopped in the current stop control mode. In the current stop control mode, the current stopping circuit 54 illustrated in FIG. 2 grounds both the switching current generating circuit 39 and the bias current generating circuit 45. The drive current Idrh is consequently not supplied to the light emitting point 12h and the light emitting point 12h does not emit a light beam, which means that the PD 14b does not output the PD current 15 to the light intensity controller 30h. While the switching current generating circuit 39 and the bias current generating circuit 45 are grounded in the current stop control mode, the light intensity controller 30h operates in the upper light intensity control mode (APC-Hh) and the lower light intensity control mode (APC-Lh). No light emission from the light emitting point 12h in the upper light intensity control mode (APC-Hh) makes the voltage V of the PD current 15 smaller than the output voltage 56 of the voltage divider 32, thereby causing the upper sampling circuit 35 to charge the first capacitor 36 excessively with electric charges that exceed the target charge amount. Similarly, no light emission from the light emitting point 12h in the lower light intensity control mode (APC-Lh) makes the voltage V of the PD current 15 smaller than the output voltage 56 of the voltage divider 32, thereby causing the lower sampling circuit 40 to charge the second capacitor 41 excessively with electric charges that exceed the target charge amount. If the cessation of the supply of the drive current Idrh to the light emitting point 12h is cancelled in this state, an excessive current is supplied to the light emitting point 12h and can damage the light emitting point 12h.

For that reason, the fourth embodiment involves forcibly discharging the charged first capacitor 36 and second capacitor 41 before the cessation of the supply of the drive current Idrh to the light emitting point 12h is cancelled.

Illustrated in FIG. 10B is when to cancel the cessation of the drive current Idrh to the light emitting point 12h according to the fourth embodiment. The timing of canceling the stopping of the current is after the light intensity controller 30h operates in the initialization mode. After the light intensity controller 30h finishes operating in the initialization mode and the charged first capacitor 36 and second capacitor 41 are forcedly discharged, the current stop signal 73h is cancelled (switched from the low level (L) to the high level (H)). The cancellation of the current stop signal 73h by a switch from the low level (L) to the high level (H) may instead be executed during the initialization mode, as long as the cancellation takes place after the forcible discharging of the charged first capacitor 36 and second capacitor 41 is completed. When the current stop signal 73 is switched to the high level (H), the current stopping circuit 54 connects the switching current generating circuit 39 to the changeover switch 38 and connects the bias current generating circuit 45 to the switch 44. This causes the first capacitor 36 and the second capacitor 41 to apply voltages to the switching current generating circuit 39 and the bias current generating circuit 45, with the result that the drive current Idr is supplied to the LD 12.

According to the embodiment, the cessation of the supply of the drive current Idr to the LD 12 is cancelled after the light intensity controller 30h operates in the initialization mode and the charged first capacitor 36 and second capacitor 41 are forcedly discharged. The supply of the drive current Idr to the LD 12 can thus be resumed without causing an excessive load on the LD 12.

The image controller 501 transmits the upper light intensity control signals 62, the lower light intensity control signals 63, and the image signal 22 to the light intensity controllers 30 in the current stop control mode as well in an attempt to make the light intensity controllers 30 operate in the upper light intensity control mode, the lower light intensity control mode, and the constant current control mode. This may allow damage to the LD 12 at the time the cessation of the supply of the drive current Idr to the LD 12 is cancelled, from an excessive amount of electric charges with which the first capacitor 36 and the second capacitor 41 are charged. According to the embodiment, however, damage to the LD 12 can be prevented by transmitting the discharge signal 64 from the image controller 501, which is provided in the image forming apparatus, before the current stop signal 73 is cancelled.

According to the embodiments described above, the supply of current to the LD 12 of the light scanning apparatus 2 can be stopped.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-223931, filed Nov. 16, 2015, which is hereby incorporated by reference herein in its entirety.

What is claimed is:

1. An image forming apparatus, comprising:
a photosensitive member;
a laser light source comprising a first light emitting point and a second light emitting point each configured to emit a laser light when being supplied with a current;
a deflector configured to deflect the laser light emitted from the laser light source so that the laser light emitted from the laser light source scans on the photosensitive member;
a light receiving portion disposed in a position to receive the laser light emitted from the laser light source, and configured to output a signal which indicates a received light intensity;
a first drive portion configured to supply a bias current to the first light emitting point, and configured to supply a drive current based on image data to the first light emitting point, the first drive portion being configured to control values of the bias current and the drive current with respect to the first light emitting point based on the signal which is input from the light receiving portion to the first drive portion by forming a first feedback loop between the first light emitting point and the light receiving portion;
a second drive portion configured to be capable of supplying a bias current to the second light emitting point, and configured to be capable of supplying a drive current based on image data to the second light emitting point, the second drive portion comprising a setting portion configured to set whether or not a current is supplied to the second light emitting point, the second drive portion being capable of controlling values of the bias current and the drive current with respect to the second light emitting point based on the signal which is input from the light receiving portion to the second drive portion by forming a second feedback loop between the second light emitting point and the light receiving portion; and
a controller configured to input to the second drive portion a first control signal which does not allow a supply of the current to the second light emitting point, to input to the first drive portion a second control signal for forming the first feedback loop, and to input to the second drive portion a third control signal for forming the second feedback loop at timing different from timing of forming the first feedback loop, in a state in which the setting portion of the second drive portion performs a setting based on the first control signal which does not allow the supply of the current to the second light emitting point.

* * * * *